(12) United States Patent
Matsushita et al.

(10) Patent No.: US 8,177,040 B2
(45) Date of Patent: May 15, 2012

(54) DISK BRAKE FOR VEHICLE

(75) Inventors: Manabu Matsushita, Nagano (JP); Akihiko Koike, Saitama (JP)

(73) Assignees: Nissin Kogyo Co., Ltd, Nagano (JP); Honda Motor Co., Ltd, Tokyo (JP)

( * ) Notice: Subject to any disclaimer, the term of this patent is extended or adjusted under 35 U.S.C. 154(b) by 1022 days.

(21) Appl. No.: 12/048,978

(22) Filed: Mar. 14, 2008

(65) Prior Publication Data
US 2008/0264735 A1    Oct. 30, 2008

(30) Foreign Application Priority Data

Mar. 27, 2007 (JP) .................................. 2007-81490

(51) Int. Cl.
*B60L 7/00* (2006.01)
(52) U.S. Cl. ...... 188/162; 188/72.3; 188/72.8; 188/158; 310/93; 310/239; 310/248; 310/249
(58) Field of Classification Search .................. 188/158, 188/159, 160, 161, 162, 72.8, 156; 310/239, 310/248, 249
See application file for complete search history.

(56) References Cited

U.S. PATENT DOCUMENTS

| | | | |
|---|---|---|---|
| 6,127,752 A * | 10/2000 | Wiesler ........................ 310/68 B |
| 6,819,019 B2 * | 11/2004 | Tamura et al. .................. 310/71 |
| 7,589,481 B2 * | 9/2009 | Sonoda et al. ................... 318/34 |
| 7,607,520 B2 * | 10/2009 | Matsushita et al. .......... 188/72.8 |
| 2007/0029143 A1 * | 2/2007 | Adachi et al. ................ 188/72.8 |
| 2007/0034459 A1 | 2/2007 | Matsushita |
| 2008/0290760 A1 * | 11/2008 | Matsushita et al. ......... 310/67 R |

FOREIGN PATENT DOCUMENTS

| | | |
|---|---|---|
| DE | 197 10 015 A1 | 9/1998 |
| DE | 10 2004 012 355 A1 | 9/2004 |
| JP | 2007-006647 A | 1/2007 |
| JP | 2007-040459 A | 2/2007 |
| JP | 2007-040460 A | 2/2007 |
| JP | 2007-040461 A | 2/2007 |
| JP | 2007-40463 A | 2/2007 |
| JP | 2007-040466 A | 2/2007 |

* cited by examiner

*Primary Examiner* — Robert A Siconolfi
*Assistant Examiner* — Mariano Sy
(74) *Attorney, Agent, or Firm* — Arent Fox LLP

(57) ABSTRACT

In a disk brake for a vehicle, an electric motor is attached to a caliper body so as to exhibit a power for urging a friction pad toward a disk rotor. The electric motor includes a brush holder for holding brushes which contact a commutator at positions at even distances in a circumferential direction of an armature. Internal feed terminals are disposed in the brush holder so as to provide connection between the brushes and feed wires respectively leading to the brushes. A rotational angle detecting sensor is disposed in the brush holder so as to detect a rotational angle of the electric motor. The rotational angle detecting sensor is disposed in the brush holder on a side opposite from the internal feed terminals with respect to the armature. Thus, it is possible to improve assemblability of the rotational angle detecting sensor to the brush holder, and facilitate operation of connecting the feed wires to the brush holder.

1 Claim, 18 Drawing Sheets

US 8,177,040 B2

DISK BRAKE FOR VEHICLE

BACKGROUND OF THE INVENTION

1. Field of the Invention

The present invention relates to a disk brake for a vehicle, comprising: an electric motor which is attached to a caliper body so as to exhibit a power for urging a friction pad toward a disk rotor, the electric motor including a motor shaft provided with an armature having a commutator, and a brush holder for holding brushes which contact the commutator at positions at even distances in a circumferential direction of the armature; internal feed terminals disposed in the brush holder so as to provide connection between the brushes and feed wires respectively leading to the brushes; and a rotational angle detecting sensor disposed in the brush holder so as to detect a rotational angle of the electric motor.

2. Description of the Related Art

Such a disk brake for a vehicle is known from Japanese Patent Application Laid-open No. 2007-40463.

In the disk brake disclosed in Japanese Patent Application Laid-open No. 2007-40463, a rotational angle detecting sensor and feed terminals are disposed in a brush holder such that they are axially superposed on each other sideways of an armature, and it is required to connect the feed wires to the feed terminals and attach the rotational angle detecting sensor to the brush holder in a small space. Therefore, it cannot be said that the electrical connecting operability and assemblability are excellent.

SUMMARY OF THE INVENTION

The present invention has been made in view of the above-described circumstances, and it is an object of the present invention to provide a disk brake for a vehicle, wherein the assemblability of the rotational angle detecting sensor to the brush holder is improved, and the operation of connecting the feed wires to the feed terminals is facilitated.

To achieve the above object, according to the present invention, there is provided a disk brake for a vehicle, comprising: an electric motor which is attached to a caliper body so as to exhibit a power for urging a friction pad toward a disk rotor, the electric motor including a motor shaft provided with an armature having a commutator, and a brush holder for holding brushes which contact the commutator at positions at even distances in a circumferential direction of the armature; internal feed terminals disposed in the brush holder so as to provide connection between the brushes and feed wires respectively leading to the brushes; and a rotational angle detecting sensor disposed in the brush holder so as to detect a rotational angle of the electric motor, wherein the rotational angle detecting sensor is disposed in the brush holder on a side opposite from the internal feed terminals with respect to the armature.

With this arrangement of the present invention, the internal feed terminals and the rotational angle detecting sensor are disposed on sides opposite from each other with respect to the armature. Therefore, the feed wire connected to each of the brushes can be easily connected to the internal feed terminal without obstruction by the rotational angle detecting sensor, and the rotational angle detecting sensor can be easily assembled in a larger space in which the internal feed terminals are not provided. Thus, it is possible to facilitate the operation of connecting the feed wires to the internal feed terminals, and improve the assemblability of the rotational angle detecting sensor to the brush holder.

The above-mentioned object, other objects, characteristics, and advantages of the present invention will become apparent from a preferred embodiment, which will be described in detail below by reference to the attached drawings.

DETAILED DESCRIPTION OF THE PREFERRED EMBODIMENT

Figure 1:
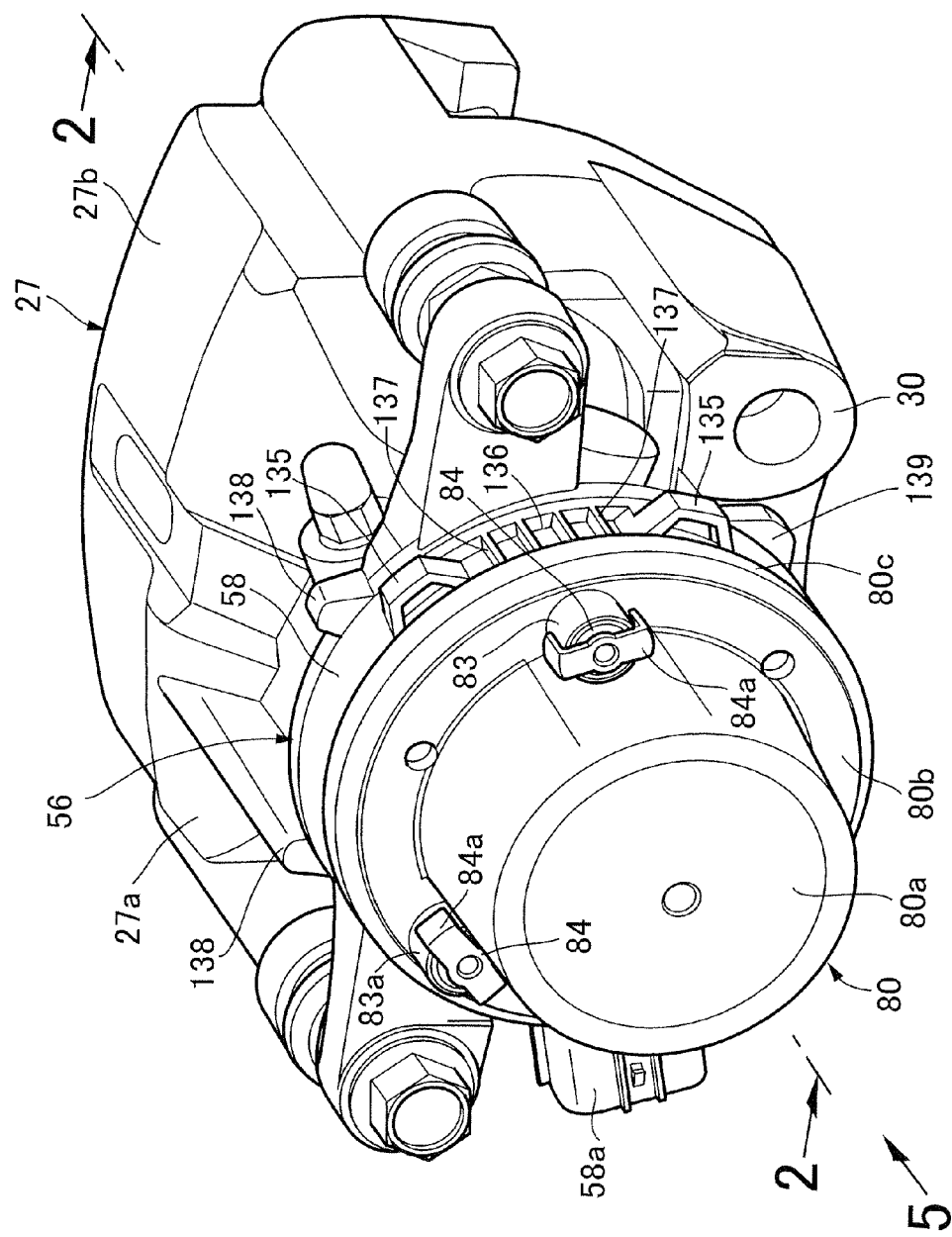
FIG. 1 is a perspective view of a disk brake for a vehicle according to an embodiment of the present invention.
Figure 2:
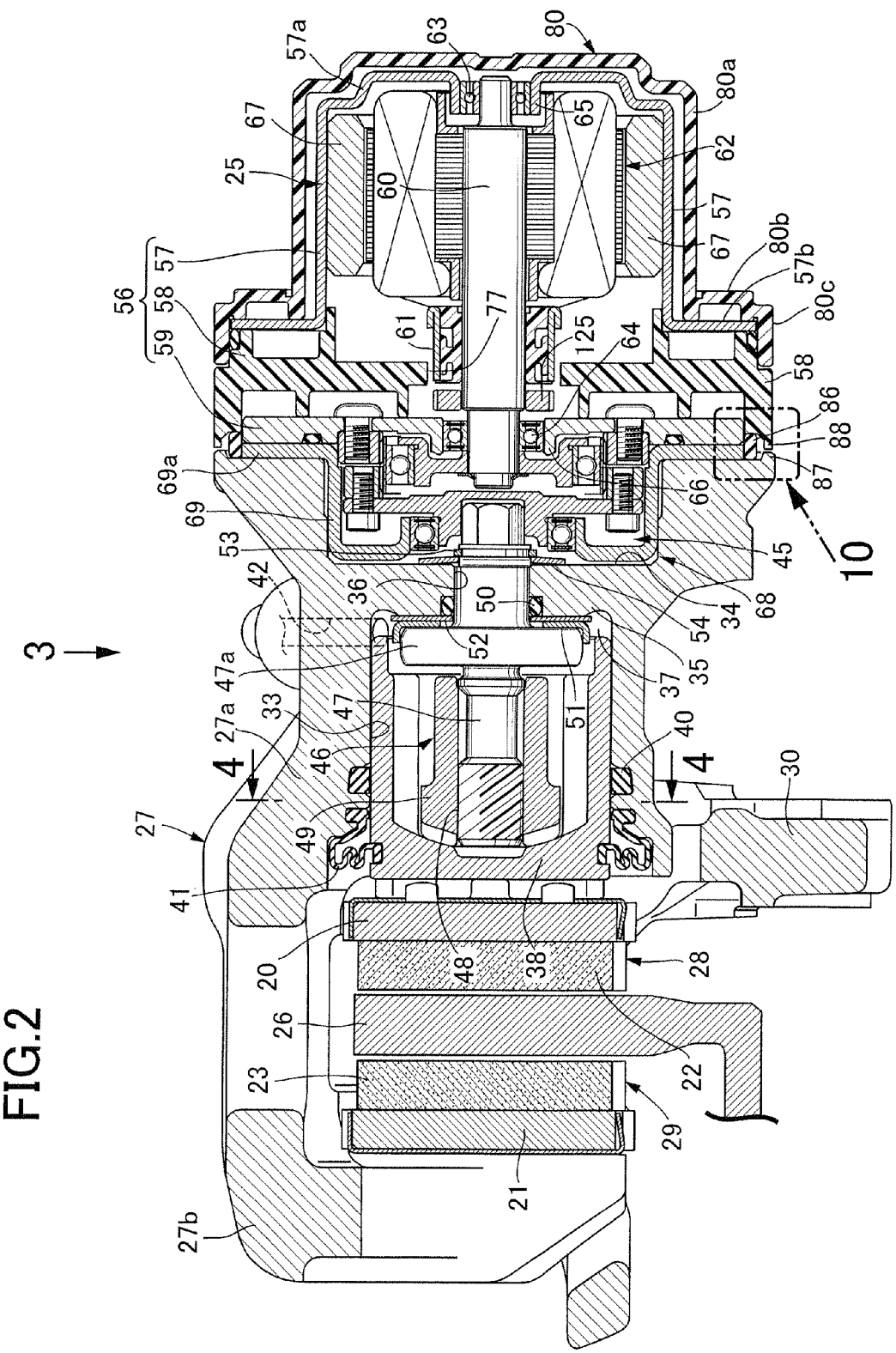
FIG. 2 is a sectional view taken along a line 2-2 in FIG. 1.
Figure 3:
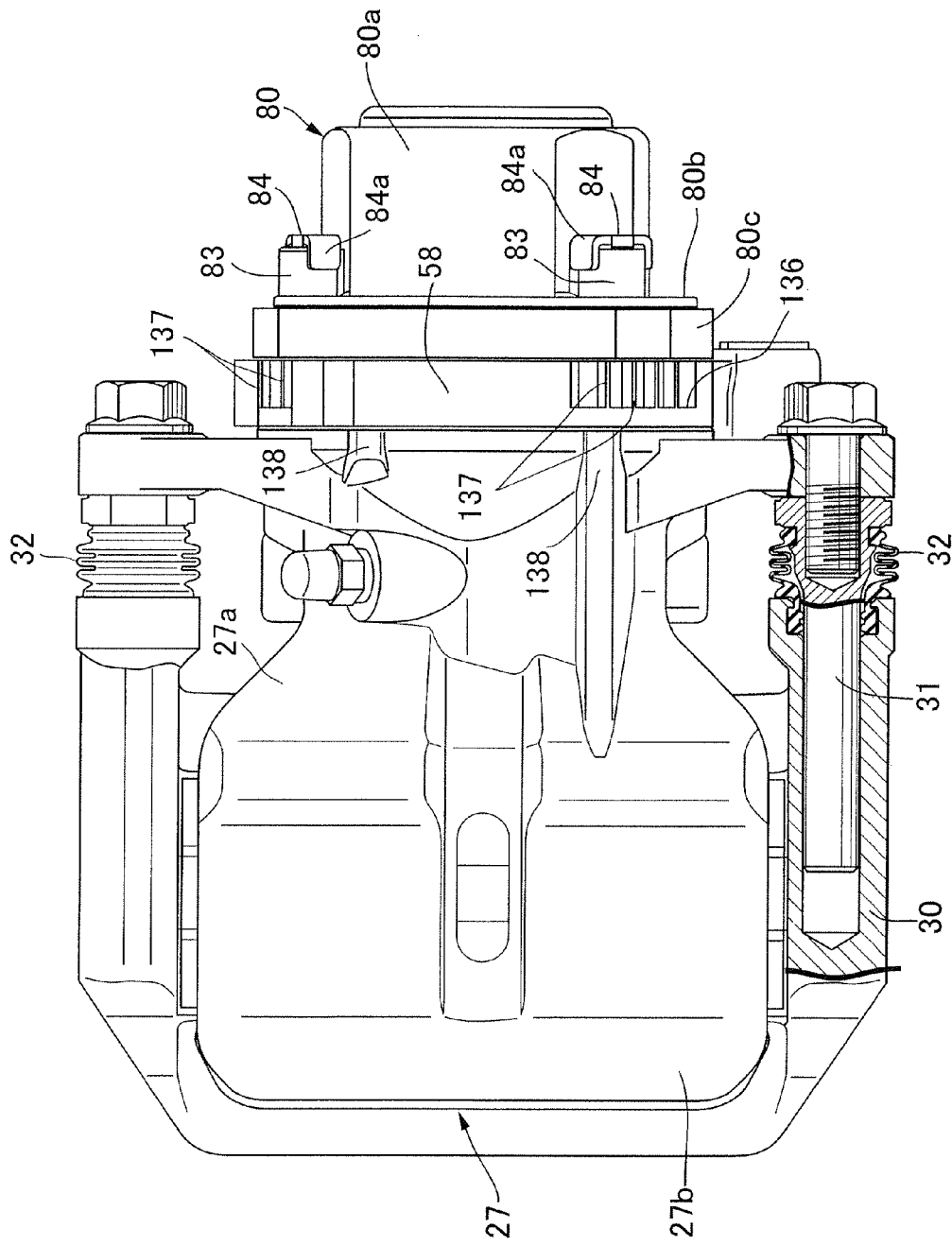
FIG. 3 is a view taken in a direction of an arrow 3 in FIG. 2.

Referring first to FIGS. 1 to 3, a disk brake for vehicle enables a service braked state by a fluid pressure and also enables a parking braked state by the operation of an electric motor 25 (see FIG. 2). The disk brake includes a disk rotor 26 adapted to be rotated along with a vehicle wheel (not shown), a caliper body 27, and a pair of friction pads 28 and 29 disposed on opposite side faces of the disk rotor 26 and between the disk rotor 26 and the caliper body 27.

The caliper body 27 includes a housing portion 27a supported for sliding in a direction along an axis of the disk rotor 26 by a bracket 30 mounted to a vehicle body, and an arm 27b extending from the housing portion 27a over the disk rotor 26 to an opposite side. Slide pins 31, 31 extending parallel to the axis of the disk rotor 26 are fixed to the housing portion 27a, and are slidably carried in the bracket 30. Boots 32, 32 are provided between the housing portion 27a and the bracket 30 to surround both the slide pins 31.

The friction pad 28 is opposed to one side face of the disk rotor 26 on the side of the housing portion 27a, and comprises a backing plate 20 and a lining 22 which is mounted on the backing plate 20 and capable of exhibiting a friction force in sliding contact with the disk rotor 26. The friction pad 29 is opposed to the other side face of the disk rotor 26 on the side of the arm 27*b*, and comprises a backing plate 21 and a lining 23 which is mounted on the backing plate 21 and capable of exhibiting a friction force in sliding contact with the disk rotor 26. Both the friction pads 28 and 29 are retained on the bracket 30 for movement in the direction along the axis of the disk rotor 26.

The housing portion 27*a* of the caliper body 27 is provided with (1) a cylinder bore 33 which has an axis parallel to the axis of the disk rotor 26 and which is opened on the side of the friction pad 28, (2) an accommodating recess 34 opened on a side opposite from the friction pad 28, and (3) a partition wall 35 interposed between the cylinder bore 33 and the accommodating recess 34. The cylinder bore 33 and the accommodating recess 34 are formed to have circular sections on the same axis. A through-bore 36 is provided in a central portion of the partition wall 35 to coaxially connect the cylinder bore 33 and the accommodating recess 34 to each other.

A bottomed cylindrical brake piston 38 with its front end closed is axially slidably received in the cylinder bore 33 so that its front end is brought into abutment against the backing plate 20 of the friction pad 28. The brake piston 38 has a fluid pressure chamber 37 formed between the piston 38 and the partition wall 34. The front end of the brake piston 38 is engaged with the backing plate 20 in order to inhibit the rotation of the brake piston 38 within the cylinder bore 33.

An annular piston seal 40 is mounted on an inner surface of the cylinder bore 33 and interposed between the caliper body 27 and the brake piston 38. An annular dust boot 41 is mounted between an opened end of the cylinder bore 33 and the brake piston 38. The housing portion 27*a* is provided with a fluid pressure passage 42 for guiding a fluid pressure to the fluid pressure chamber 37.

An output from the electric motor 25 for exhibiting a power for advancing and retracting the friction pads 28 and 29 with respect to the disk rotor 26 is transmitted to the brake piston 38 through a decelerating mechanism 45 for decelerating the output and a motion converting mechanism 46. The motion converting mechanism 46 is accommodated in the cylinder bore 33 in the caliper body 27 in such a manner that it is disposed behind the brake piston 38. The decelerating mechanism 45 supports the electric motor 25, with its large portion being accommodated in the accommodating recess 34. The electric motor 25 is attached to the housing portion 27*a* of the caliper body 27 on a side opposite from the disk rotor 26.

The motion converting mechanism 46 includes a rotary shaft 47 coaxial with the cylinder bore 33, and a nut 49 which is engaged with a brake piston for non-rotatably relative to each other and which is threadedly engaged with external threads engraved in an outer periphery of a leading end of the rotary shaft 47. One end of the rotary shaft 47 is rotatably passed through the through-bore 36 in the partition wall 35 on the side opposite from the brake piston 38. A collar 47*a* is integrally provided on the rotary shaft 47 to protrude radially outwards, so that it is opposed to a surface of the partition wall 35 facing the fluid pressure chamber 37. An O-ring 50 is interposed between the partition wall 35 of the housing portion 27*a* and the rotary shaft 47. A thrust bearing 51 and a washer 52 are interposed between the surface of the partition wall 35 facing the fluid pressure chamber 37 and the collar 47*a*.

A sliding surface of the thrust bearing 51 on the washer 52 is coated with a resin, thereby providing a sealing effect between the thrust bearing 51 and the washer 52 to alleviate of a loading pressure provided by the O-ring 50. As a result, it is possible to improve the durability (friction resistance) of the O-ring 50.

A stop ring 53 is mounted around an outer periphery of a protrusion of the rotary shaft 47 on the side of the accommodating recess 34, and a Belleville spring 54 is interposed between the partition wall 35 of the caliper body 27 and the stop ring 53. The rotary shaft 47 is biased toward the electric motor 25 by a resilient force exhibited by the Belleville spring 54. The resilient force exhibited by the Belleville spring 54 is set at a value equal to or larger than a thrust force applied to the rotary shaft 47 toward the side opposite from the electric motor 25 by a roll-back caused in the O-ring 50 upon release of the fluid pressure after the application of the fluid pressure on the fluid pressure chamber 37.

Figure 4:
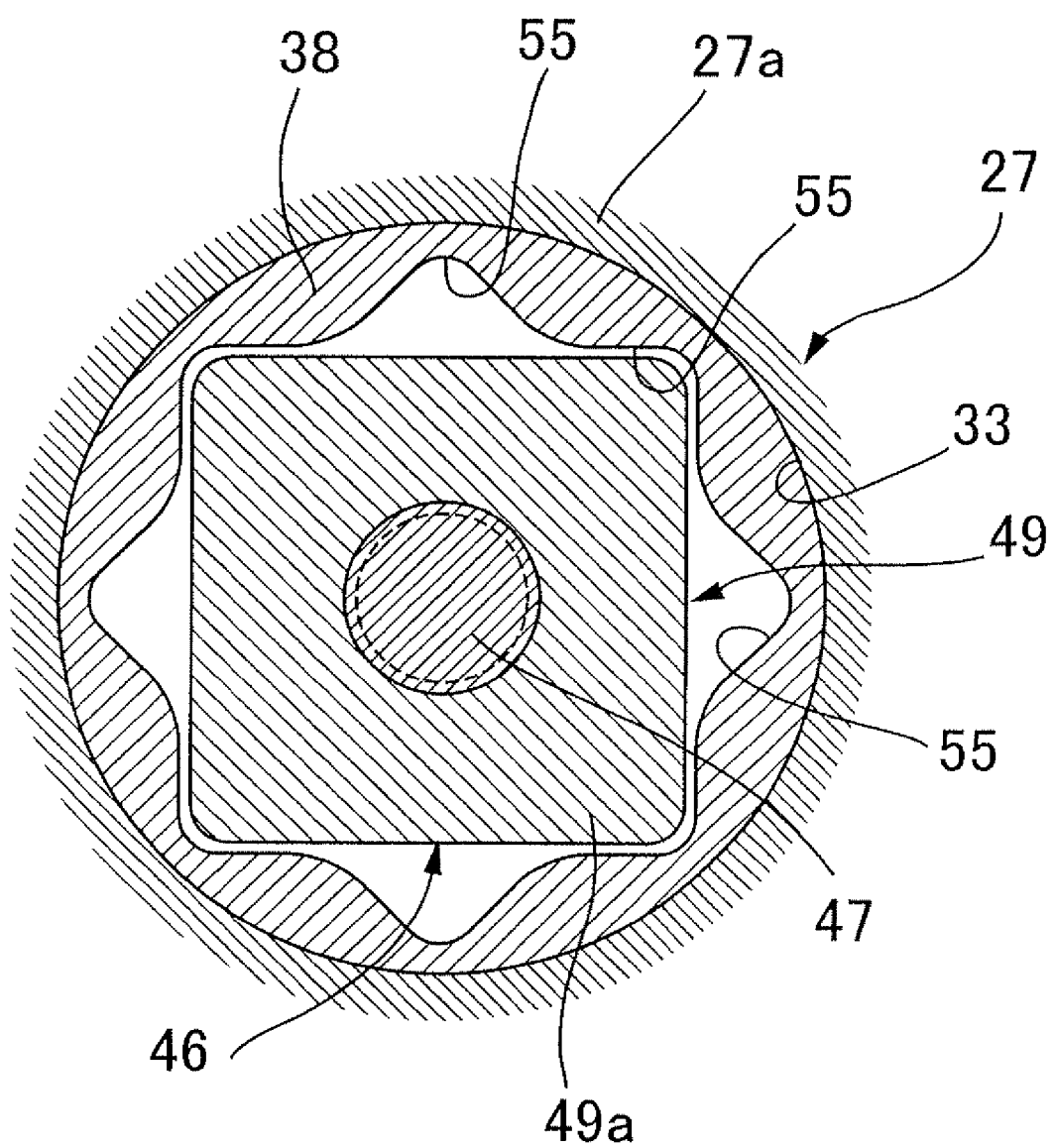
FIG. 4 is a sectional view taken along a line 4-4 in FIG. 2.

Referring also to FIG. 4, the rotary shaft 47 is threadedly engaged with the nut 49 surrounding the rotary shaft 47 within the brake piston 38. The nut 49 has, at its front end, an engagement portion 49*a* having a regular tetragonal outer periphery. A front end face of the engagement portion 49*a* abuts against an inner surface of the front end of the brake piston 38.

On the other hand, locking grooves 55 in a number corresponding to an integral multiplication (twofold in this embodiment) of the number of four corners of the engagement portion 49*a* are provided in an inner periphery of the bottomed cylindrical brake piston 38 at locations circumferentially spaced apart from one another while extending axially such that the corners are selectively brought into engagement with the locking grooves 55 at a plurality of points with their phases circumferentially displaced from one another. In other words, the inner periphery of the brake piston 38 is formed into a star-shape which corresponds to the shape of an outer periphery of the engagement portion 49*a* and in which a plurality of regular polygonal shapes with phases displaced from one another are superposed together. In this embodiment, the inner periphery of the brake piston 38 is formed into a star-shape in which two regular tetragonal shapes with phases displaced from each other are superposed together.

In such a motion converting mechanism 46, when the power from the electric motor 25 is decelerated by the decelerating mechanism 45 and transmitted to the rotary shaft 47 to rotate the rotary shaft 47 in one direction, the power of the rotation of the rotary shaft 47 is converted into an axially advancing/retracting force for the brake piston 38 in a state in which the rotations of the brake piston 38 and the nut 49 is inhibited. Thus, the disk rotor 26 is clamped from opposite sides by the friction pads 28 and 29 by means of an action and a reaction caused by the forward sliding of the brake piston 38, thereby generating a braking force. On the other hand, the brake piston 38 is slid axially rearwards by the rotation of the rotary shaft 37 in the other direction, thereby canceling the braked state.

Figure 5:
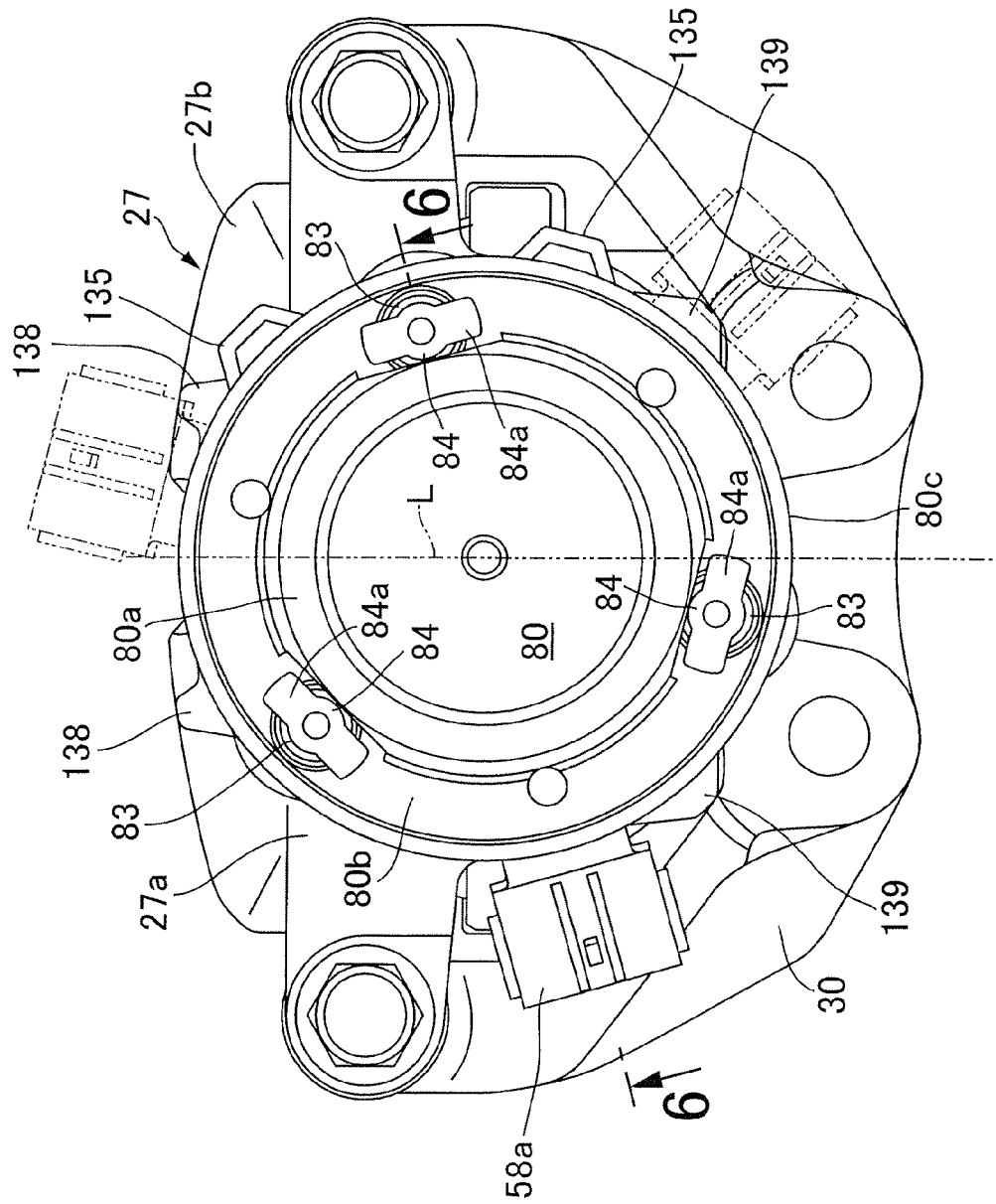
FIG. 5 is a view taken in a direction of an arrow 5 in FIG. 1.
Figure 6:
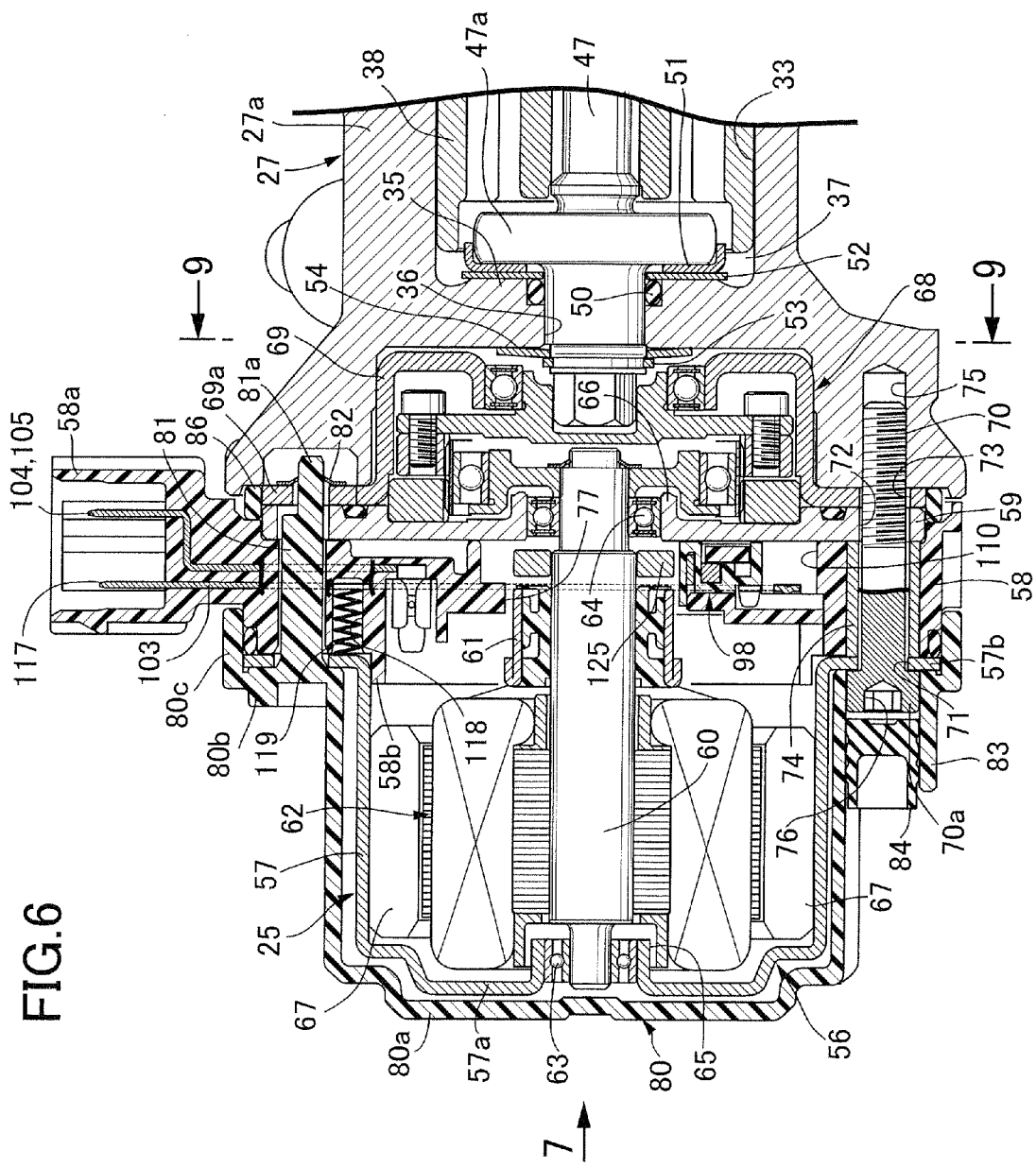
FIG. 6 is a sectional view taken along a line 6-6 in FIG. 5.

Referring also to FIGS. 5 and 6, a motor case for the electric motor 25 comprises: a yoke 57 which is formed into a bottomed tubular shape (a bottomed cylindrical shape in this embodiment) from a material having an electrical conductivity and which has an end wall 57*a* at one end and a flange 57*b* overhanging radially outwards at the other end; a brush holder 58 formed into a ring-shape from a synthetic resin and having a center bore 77 in such a manner its outer periphery is put into abutment against the flange 57*b* of the yoke 57; and a lid plate 59 clamping the brush holder 58 between the lid plate 59 and the other end, i.e., the opened end of the yoke 57. The brush holder 58 is integrally provided with a short cylindrical portion 58*b* fitted into the opened end of the yoke 57.

A motor shaft 60 passed through the center bore 77 in the brush holder 58 is rotatably supported by the motor case 56, and provided with an armature 62 having a commutator 61. One end of the motor shaft 60 is rotatably passed through a cylindrical first bearing housing 65 provided on the end wall 57a at one end of the yoke 67 in the motor case 56. A first ball bearing 63 is interposed between the first bearing housing 65 and the motor shaft 60. The other end of the motor shaft 60 is rotatably passed through a cylindrical second bearing housing 66 mounted at a central portion of the lid plate 59 in the motor case 56. A second ball bearing 64 having a seal is interposed between the second ball bearing 64 and the motor shaft 60. That is, the one end of the motor shaft 60 is rotatably supported at one end of the yoke 57 with the first ball bearing 63 interposed therebetween, and the other end of the motor shaft 60 is rotatably supported on the lid plate 59 with the second ball bearing 64 interposed therebetween. A plurality of magnets 67 are secured to the inner periphery of the yoke 57 in a region corresponding to the armature 62.

The decelerating mechanism 45 is housed in the case 68 which comprises the lid plate 59 constituting a portion of the motor case 56, and a case member 69 which is formed into a cup-shape and which has at its opened end a flange 69a which abuts against the outer periphery of the lid plate 59 from a side opposite from the electric motor 25. The electric motor 25 is attached to the flange 57b of the caliper boy 27 by bolts 70 fastened to the caliper body 27 at a plurality of points (three points in this embodiment) circumferentially spaced apart from one another.

Figure 7:
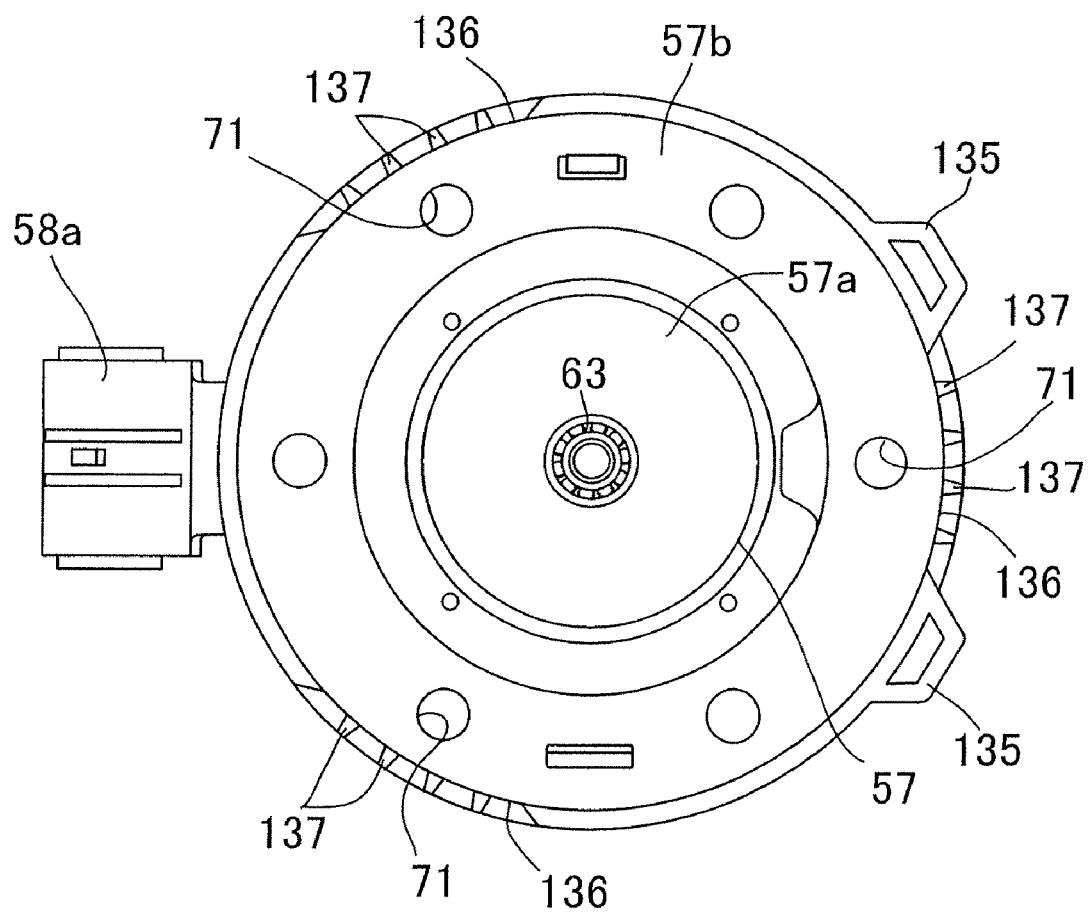
FIG. 7 is a view taken in a direction of an arrow 7 in FIG. 6 with a motor cover omitted.

Referring also to FIG. 7, insertion bores 71 for insertion of the bolts 70 are provided in the flange 57b of the motor case 56 at a plurality of points (three point in this embodiment) circumferentially spaced apart from one another, and insertion bores 72 and 73 corresponding to the insertion bores 71 are provided in the outer peripheral portion of the lid plate 59 and the flange 69a of the case member 69. Metal cylindrical collars 74 for insertion of the bolts 70 are embedded in portions of the outer periphery of the brush holder 58 corresponding to the insertion bores 71, 72 and 73 such that their opposite ends abut against the flange 57b of the yoke 57 and against the lid plate 59. Thus, the bolts 70 are inserted through the insertion bores 71, the collars 74 and the insertion bores 72 and 73 such that their enlarged heads 70a are brought into abutment and engagement with the flange 57b, and are threadedly fitted into threaded bores 75 provided in the housing portion 27a of the caliper body 27. Moreover, engagement recesses 76 having a non-circular sectional shape for engagement with a tool (not shown) for rotating the bolts 70 are provided in outer end faces of the enlarged heads 70a.

Figure 8:
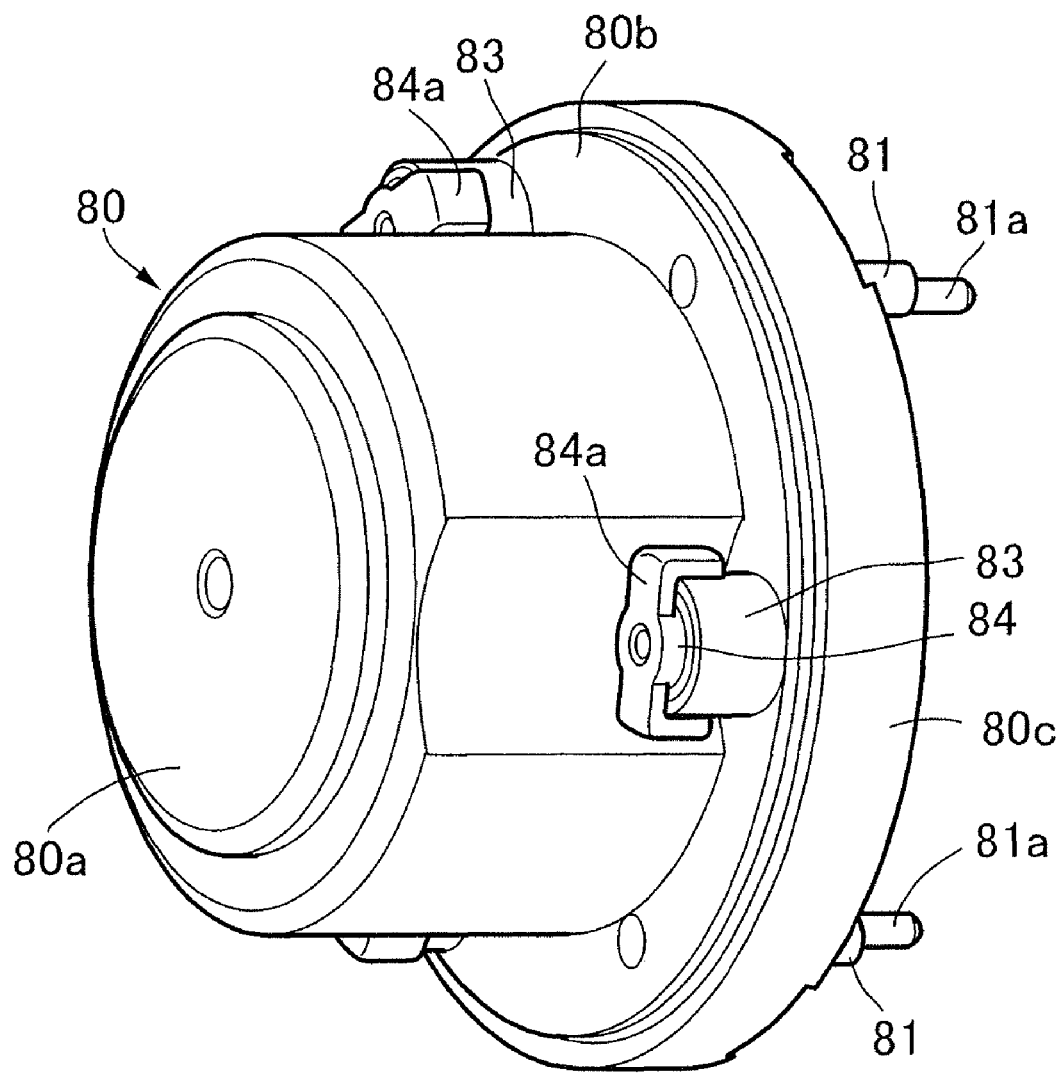
FIG. 8 is a perspective view of the motor cover.

Referring also to FIG. 8, at least a portion of the motor case 56 (a portion of each of the yoke 57 and the brush holder 58 in this embodiment) is covered with a motor cover 80 made of a synthetic resin. The motor cover 80 is integrally includes three portions: a bottomed cylindrical portion 80a coaxially covering the yoke 57; a flange 80b overhanging outwards from an opened end of the bottomed cylindrical portion 80a in such a manner that it is in close contact with and superposed on the flange 57b of the yoke 57; and a short cylindrical portion 80c connected at a right angle to an outer peripheral edge of the flange 80b and coaxially covering a portion of the brush holder 58.

Figure 9:
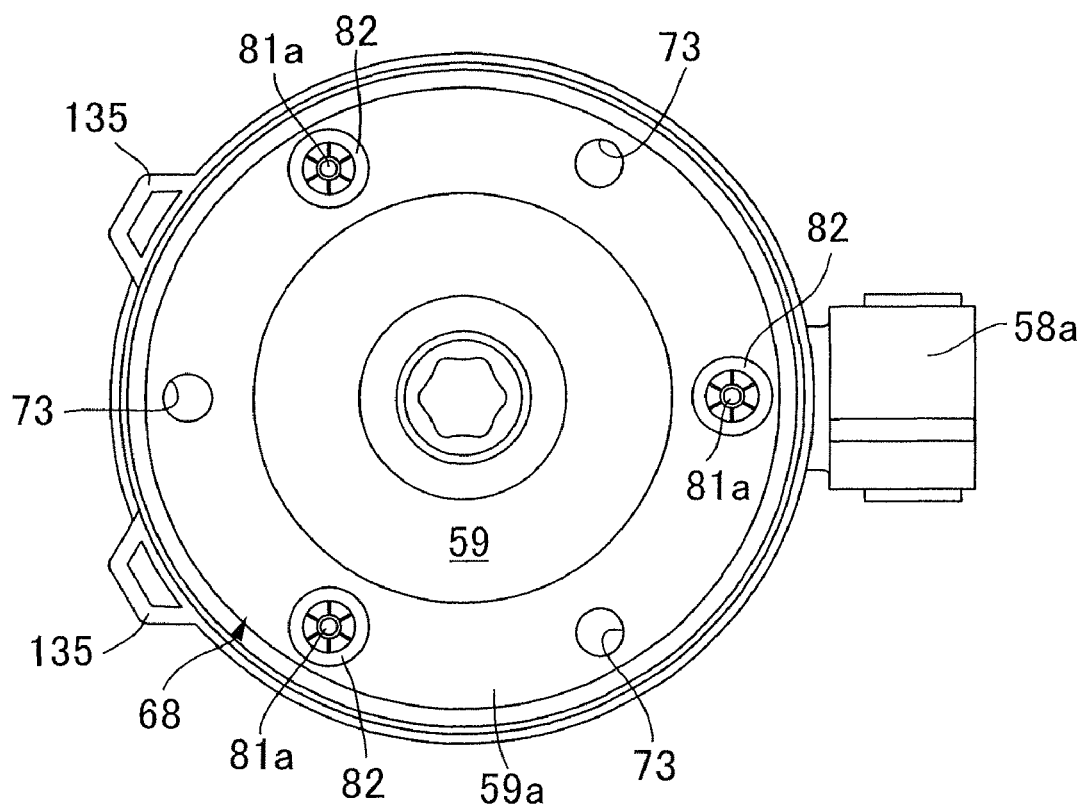
FIG. 9 is a view taken along a line 9-9 in FIG. 6 with a caliper body omitted.

The flange 80b of the motor cover 80 is integrally provided with base ends of a plurality of, e.g., three connecting legs 81 passed through the motor case 56 and the case 68. Moreover, leading ends of connecting legs 81 passed through the flange 69a of the case member 69 in the case 68 are fixed in an engaged manner to the flange 69a of the case member 69. In this embodiment, a small-diameter eccentric shaft portion 81a is integrally provided at each of the leading end of the connecting leg 81, and as shown in FIG. 9, push nuts 82 are mounted to the small-diameter shaft portions 81 to come into abutment and engagement with the flange 69a. It should be noted that the leading ends of the connecting legs 81 is fixed and engaged by heat-crimping with the flange 69a of the case member 69.

The motor cover 80 is configured so that its flange 80b is brought into close contact with the flange 57b of the yoke 57 in the motor case 56 over the entire peripheries of the enlarged heads 70a of the bolts 70. The flange portion 80b of the motor cover 80 is integrally provided with tubular portions 83 through which the bolts 70 can be inserted and which cover the enlarged heads 70a, respectively.

Moreover, caps 84 made of an elastic material, e.g., a rubber are detachably fitted into the leading ends of the tubular portions 83 so as to liquid-tightly close the leading ends of the tubular portions 83. Moreover, the cap 84 is integrally provided with a knob 84a which is adapted to be located outside the tubular portion 83 in a state in which the cap 84 is fitted into the tubular portion 83. The knob 84a is formed into a shape such that it clamps the leading end of the tubular portion 83 from the outside in a natural state in which no force is applied.

Figure 10:
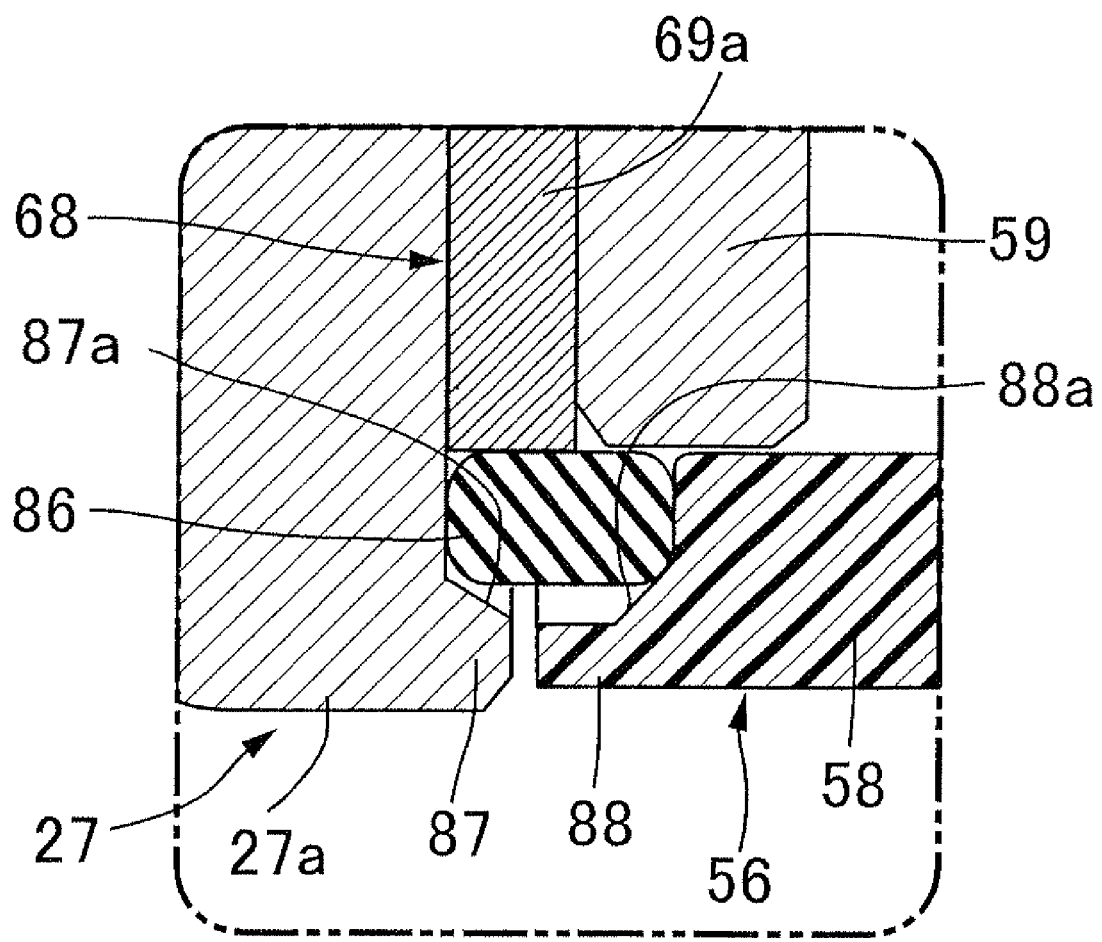
FIG. 10 is an enlarged view taken in a direction of an arrow 10 in FIG. 2.

Referring to FIG. 10, an annular seal member 86 having an oblong cross-sectional shape longer in a direction along the axis of the electric motor 25 is interposed between opposed surfaces of the brush holder 58 constituting a portion of the motor case 56 and the housing 27a of the caliper body 27 such that it is restricted from being flexed inward or outward in the lateral direction. In this embodiment, the seal member 86 surrounds the outer periphery of the case 68 having the decelerating mechanism 45 housed therein, and is restricted from being flexed inward in the lateral direction by the outer periphery of the case 68.

Moreover, annular restricting portions 87 and 88 are projectingly provided on opposed surfaces of the housing 27a of the caliper body 27 and the brush holder 58 so as to extend in a direction to approach each other. The annular restricting portions 87 and 88 have restricting faces 87a and 88a opposed to the seal member 86 from the other of the inward and outward lateral directions (the outward lateral direction in this embodiment). Both the restricting faces 87a and 88a are formed into tapered faces which are inclined so as to get away from the seal member 86 toward leading ends of the restricting portions 87 and 88.

Figure 11:
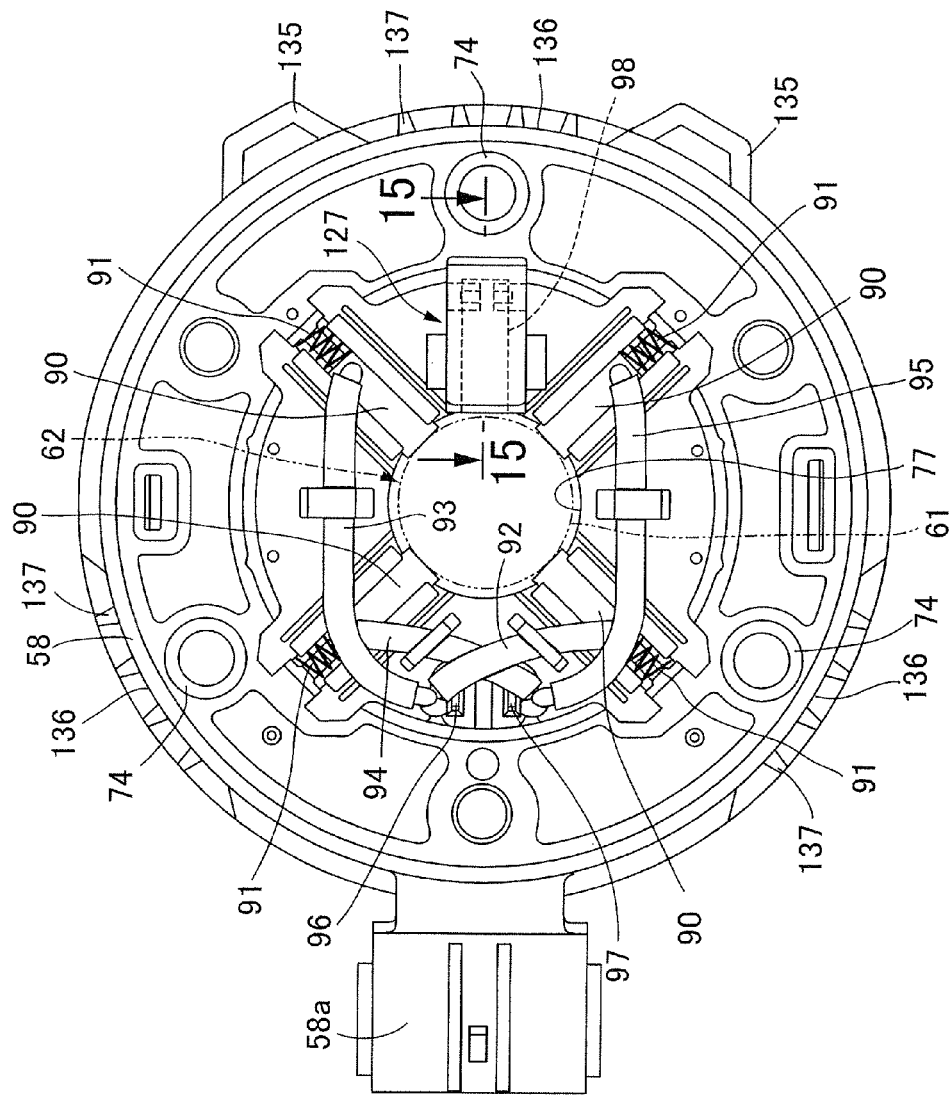
FIG. 11 is a view showing a brush holder viewed in the same direction as in FIG. 7 with the motor cover omitted.

Referring to FIG. 11, a plurality of, e.g., four brushes 90 are retained on the brush holder 58 to come into sliding contact with the commutator 61 of the armature 62, so that they can be slid in a radial direction of the commutator 61 at locations equally spaced apart from one another in a circumferential direction of the commutator 61. The brushes 90 are biased by springs 91 in a direction to come into sliding contact with the commutator 61.

A plus-side internal feed terminal 96 and a minus-side internal feed terminal 97 are disposed adjacent each other on the brush holder 58. The plus-side internal feed terminal 96 interconnects plus-side feed wires 92 and 93 respectively connected to two of the four brushes 90 disposed at a distance of 90 degree. The minus-side internal feed terminal 97 interconnects minus-side feed wire 94 and 95 respectively connected to the remaining brushes 90. A rotational angle detecting sensor 98 for detecting a rotational angle of the electric motor 25 is disposed on the brush holder 58 on a side opposite from the plus-side and minus-side internal feed terminals 96 and 97 with respect to the armature 62.

Figure 12:
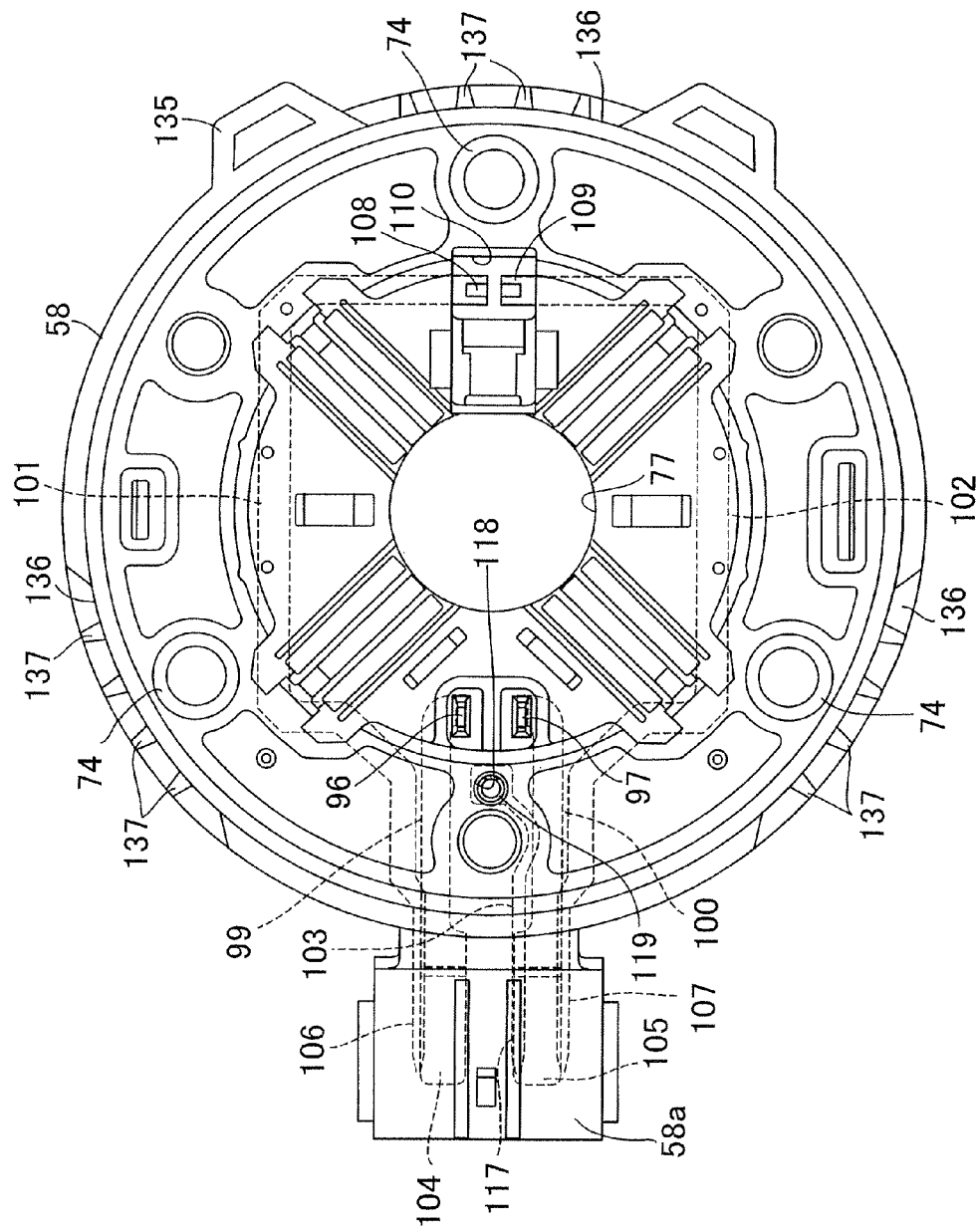
FIG. 12 is a view showing the brush holder viewed in the same direction as in FIG. 11 with the brushes and the sensor cover omitted.
Figure 13:
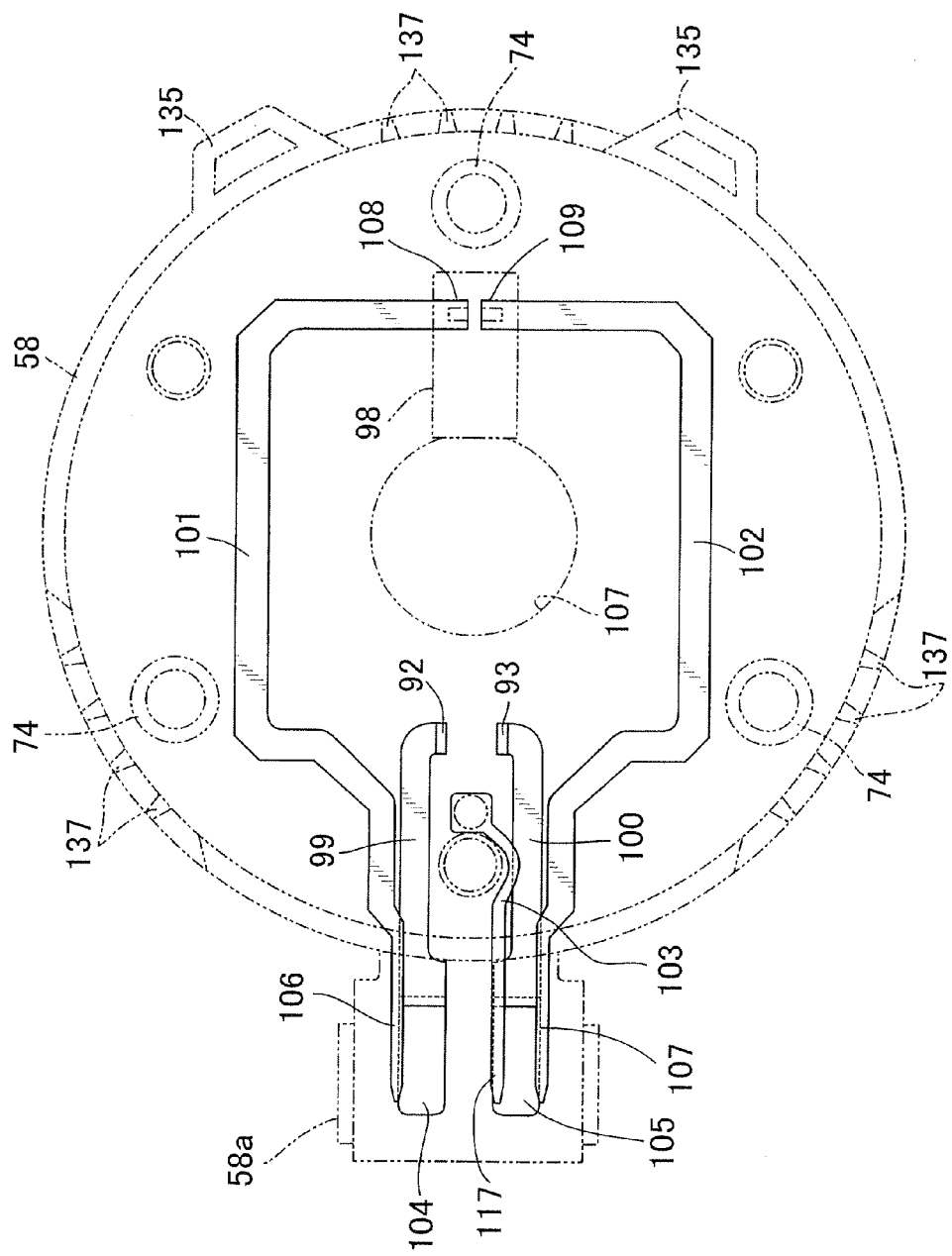
FIG. 13 is a view taken in the same direction as in FIG. 11 for showing a state of a lead frame embedded in the brush holder.

Referring to FIGS. 12 and 13, first, second, third, fourth and fifth lead frames 99, 100, 101, 102 and 103 made of a conductive metal are embedded in the brush holder 58 in such a manner that they are mold-coupled together upon the die-molding of the brush holder. The first and second lead frames 99 and 100 are embedded in the brush holder 58 so as to form plus-side and minus-side external feed terminals 104 and 105 at one ends, and also form the plus-side and minus-side internal feed terminals 96 and 97 at the other ends. The third and fourth lead frames 101 and 102 are embedded in the brush holder 58 so as to form plus-side and minus-side external terminals 106 and 107 for the sensor at one ends, and also form plus-side and minus-side internal terminals 108 and 109 for the sensor at the other ends. The rotational angle detecting sensor 98 is connected to the plus-side and minus-side internal terminals 108 and 109 for the sensor, which face an opening 110 provided in the brush holder 58 in a region corresponding to the rotational angle detecting sensor 98.

Figure 14:
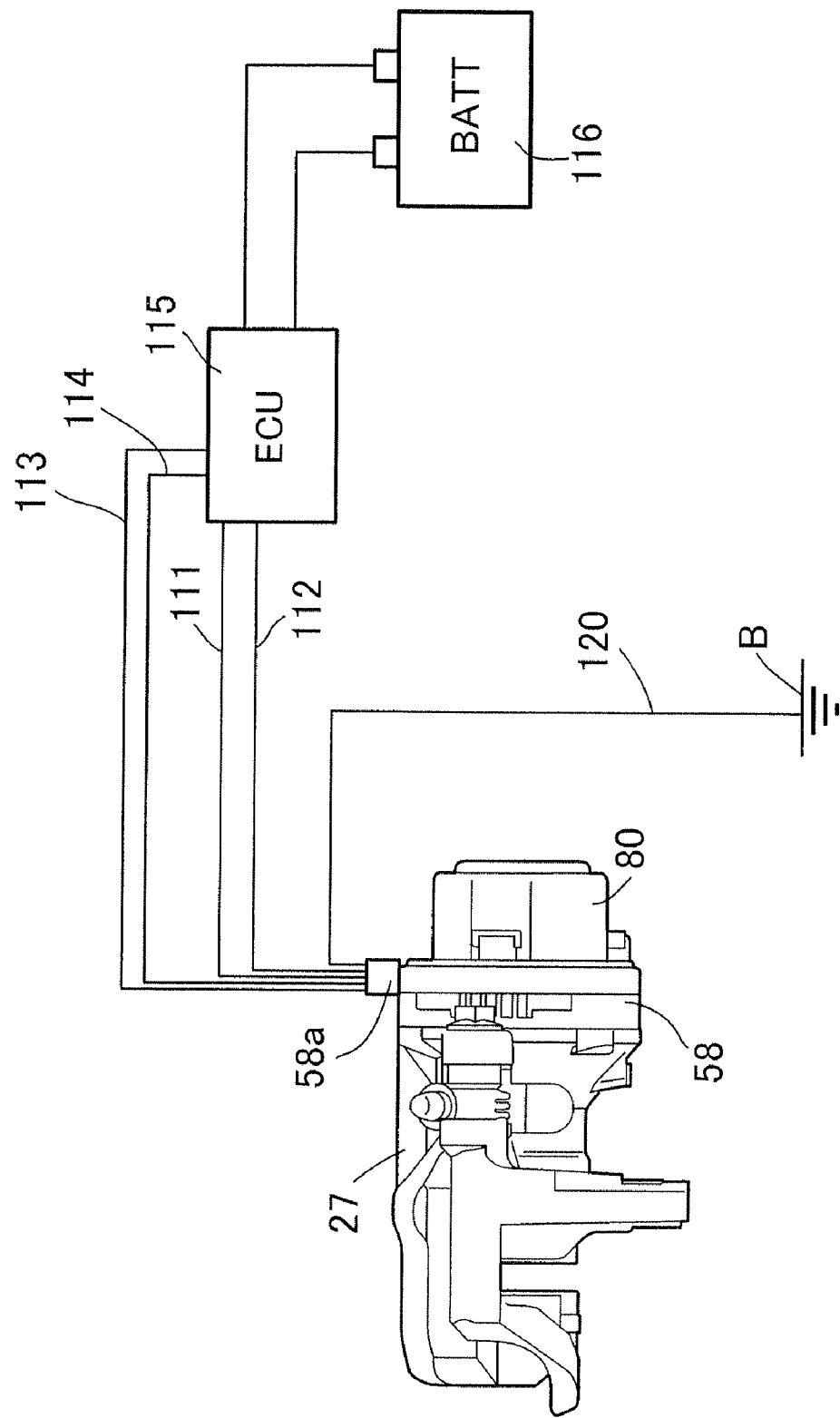
FIG. 14 is a view showing an electrically connected state of an electric motor.

A coupler portion 58a is integrally formed on the brush holder 58 to protrude sideways of the brush holder 58. The plus-side and minus-side external feed terminals 104 and 105 and the plus-side and minus-side external terminals 106 and 107 for the sensor are disposed within the coupler portion 58a. As shown in FIG. 14, a plus-side external power source wire 111 and a minus-side external power source wire 112 are connected to the plus-side and minus-side external feed terminals 104 and 105 in the coupler portion 58a, and a plus-side external lead wire 113 for the sensor and a minus-side external lead wire 114 for the sensor are connected to the plus-side and minus-side external terminals 106 and 107 for the sensor in the coupler portion 58a.

A battery 116 is connected to an electronic control unit 115 for controlling the operation of the electric motor 25. The plus-side external power source wire 111, the minus-side external power source wire 112, the plus-side external lead wire 113 for the sensor and the minus-side external lead wire 114 for the sensor are connected to the electronic control unit 115.

In addition to the plus-side and minus-side external feed terminal 104 and 105 as well as the plus-side and minus-side external terminals 196 and 107 for the sensor, a noise-countermeasure terminal 117 for electrically connecting the yoke 57 to the vehicle body B is mounted on the electric motor 25. The noise-countermeasure terminal 117 is formed at one end of the fifth lead frame 103 and disposed within the coupler portion 58a along with the plus-side external feed terminal 104, the minus-side external feed terminal 105, the plus-side external terminal 106 for the sensor and the minus-side external terminal 107 for the sensor.

Referring carefully to FIG. 6, an accommodating bore 118 is provided in the brush holder 58 with a portion of the fifth lead frame 103 facing the accommodating bore 118, and a coil spring 119 made of a metal material having an electrical conductivity is accommodated in the accommodating bore 118 in such a manner that one end thereof is in abutment against the fifth lead frame 103 and the other end is in abutment against the flange 57b of the yoke 57. Namely, the noise-countermeasure terminal 117 is electrically connected to the yoke 57 through the fifth lead frame 103 and the coil spring 119. Moreover, a ground wire 120 leading to the vehicle body B is connected to the noise-countermeasure terminal 117, as shown in FIG. 14.

Figure 15:
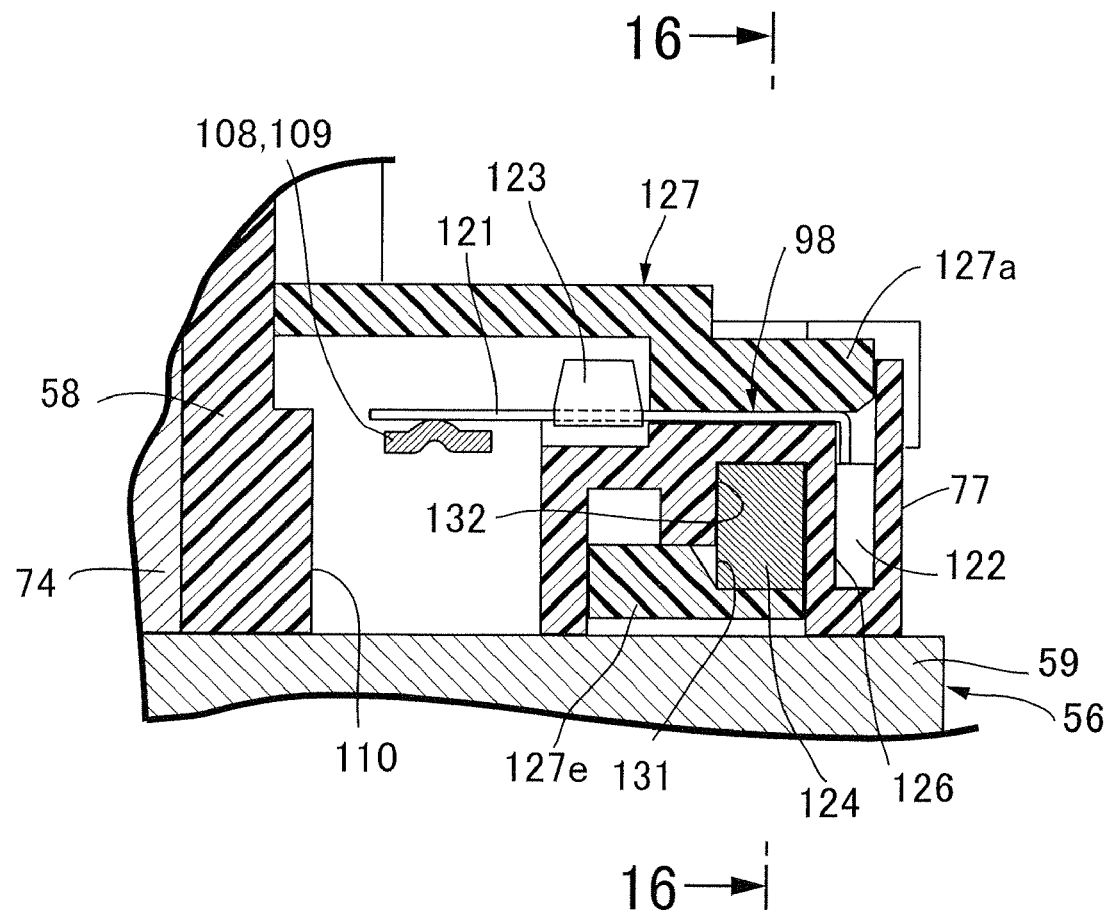
FIG. 15 is an enlarged sectional view taken along a line 15-15 in FIG. 11.
Figure 16:
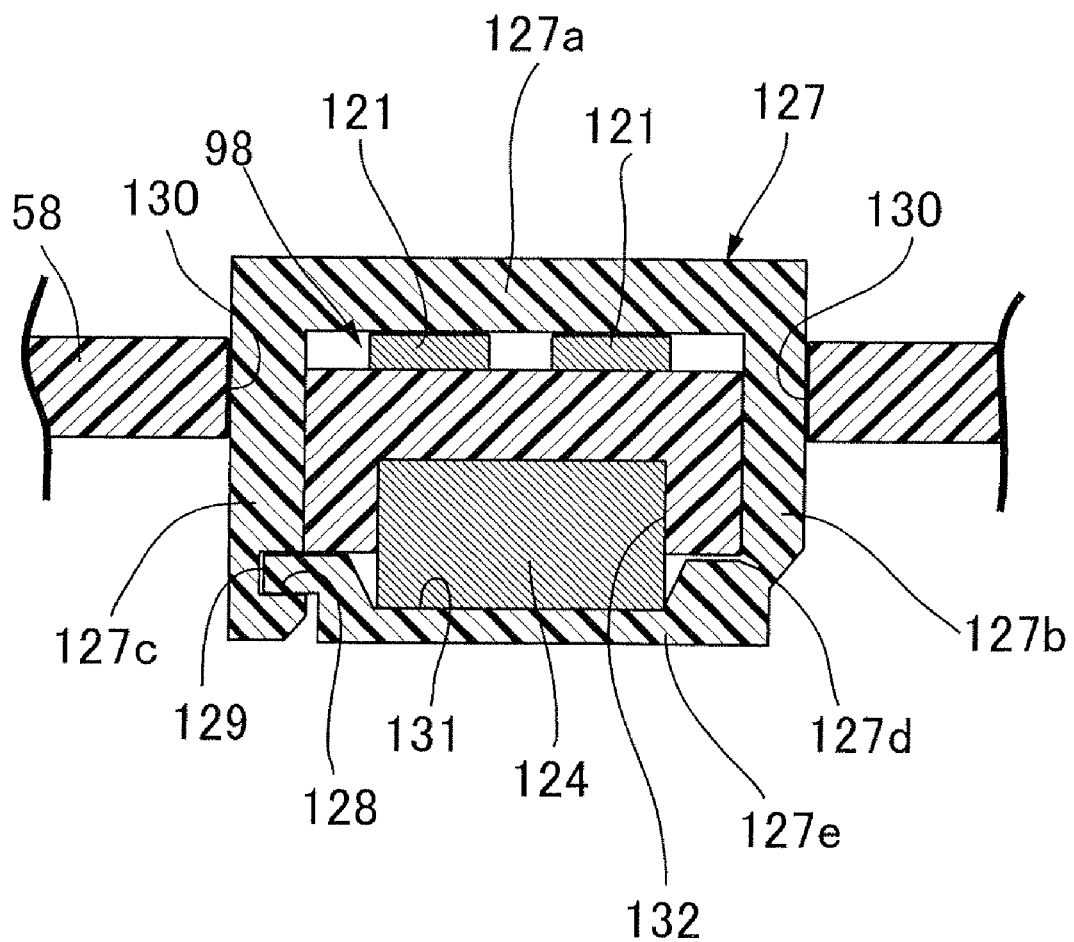
FIG. 16 is an enlarged sectional view taken along a line 16-16 in FIG. 15.

Referring to FIGS. 15 and 16, the rotational angle detecting sensor 98 comprises: a pair of conductive plate 121 parallel to each other; and a Hall IC 122 attached to one ends of the rotational angle detecting sensor 98; and a capacitor 123 provided at a location between intermediate portions the conductive plates 121. A magnet 124 is attached to the brush holder 58 at a location close to the Hall IC 122. A pulser 125 (see FIGS. 5 and 6) to be detected by the rotational angle detecting sensor 98 is mounted on the motor shaft 60 within the motor case 56 so that it is located inside the Hall IC 122.

A mounting recess 126 located nearer the center bore 77 and between the center bore 77 and the opening 110 is provided in the brush holder 58 at a location outside the pulser 125 mounted on the motor shaft 60 so that it is opened to a side opposite from the lid plate 59. The Hall IC 122 is accommodated in the mounting recess 126. Each of the conductive plates 121 is bent approximately at a right angle in such a manner that the Hall IC 122 at one end is accommodated in the mounting recess 126, and the other end is extended to a side opposite from the pulser 125. The other ends of the conductive plate 121 are electrically connected to the plus-side and minus-side internal terminals 108 and 109 for the sensor within the opening 110 in the brush holder 58, respectively.

The Hall IC 122 accommodated in the mounting recess 126 outside the pulser 125 and the capacitor 123 are retained by the brush holder 58 of the motor case 56 and by a sensor cover 127 detachably mounted to the brush holder 58.

Figure 17:
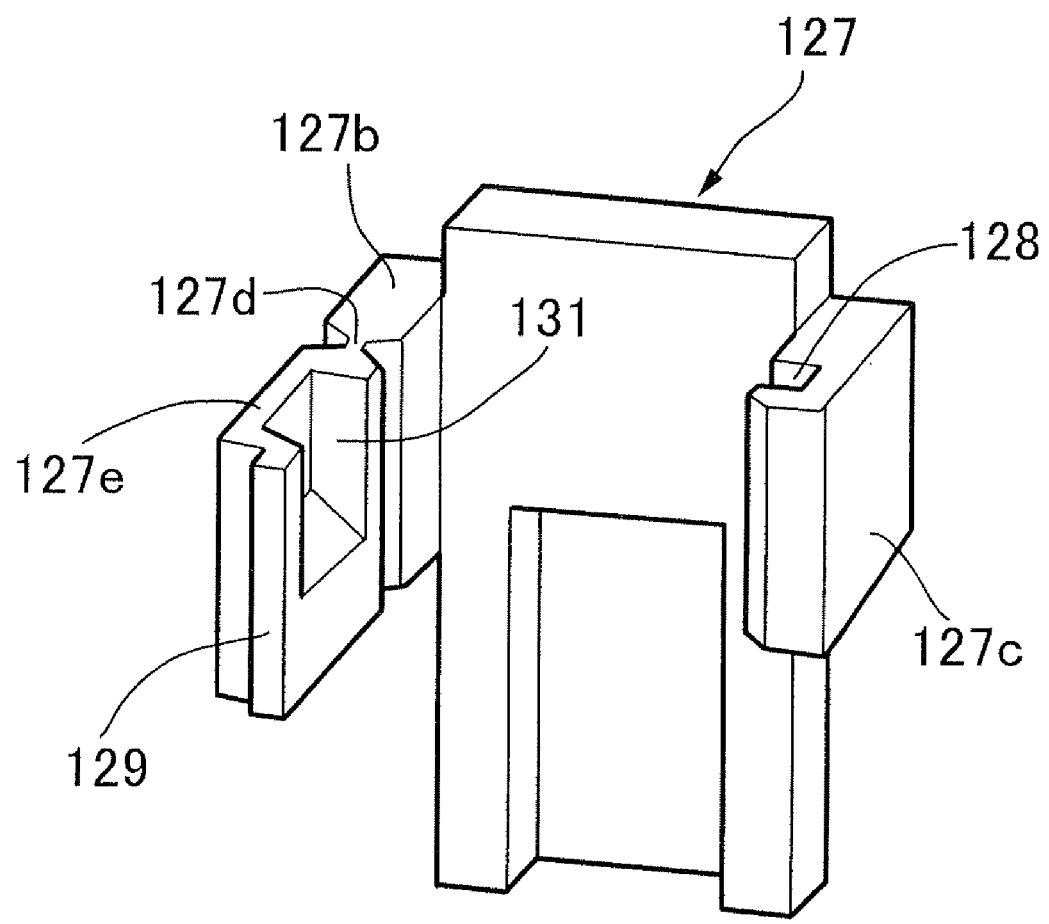
FIG. 17 is a perspective view of the sensor cover.

Referring to FIG. 17, the sensor cover 127 integrally includes (1) a first clamping plate 127a which clamps the conductive plates 121 having the Hall IC 122 accommodated in the mounting recess 126 between the first clamping plate 127a and the brush holder 58, (2) first and second side plates 127b and 127c connected to right angles to opposite sides of the first clamping plate 127, respectively, and (3) a second clamping plate 127e connected at its base end to the first side plate 127b through a hinge portion 127d. An engagement claw 129 is projectingly provided at a leading end of the second clamping plate 127e, and is capable of being resiliently brought into engagement with a locking recess 128 provided in an inner surface of the second side plate 127c.

Rectangular insertion bores 130 are provided in the brush holder 58 on opposite sides of a region where the conductive plates 121 are disposed between the mounting recess 126 and the opening 110. The first side plate 127b and the second clamping plate 127e in states in which they are not bent at the hinge portion 127d are inserted through one of the insertion bores 130, and the second side plate 127c is inserted through the other insertion bore 130.

The second clamping plate 127e inserted through the one insertion bore 130 and protruding toward the lid plate 59 is bent at aright angle at the hinge portion 127d, and the engagement claw 129 is resiliently brought into engagement with the locking recess 128 in the second side plate 127c inserted through the other insertion bore 130, whereby the sensor cover 127 is detachably attached to the brush holder 58, and the Hall IC 122 is retained between the sensor cover 127 and the brush holder 58. Moreover, Recesses 131 and 132 corresponding to each other are provided in opposed surfaces of the second clamping plate 127e and the brush holder 58. The magnet 124 is retained between the second clamping plate 127e and the brush holder 58 in such a manner that it is fitted into the recesses 131 and 132.

The first clamping plate 127a is formed to cover the opening 110 from a side opposite from the lid plate 59, and the plus-side and minus-side internal terminals 108 and 109 for the sensor are connected to the conductive plate 121 within the opening 110. Therefore, connections of the plus-side and minus-side internal terminals 108 and 109 for the sensor are covered with the sensor cover 127.

As clearly shown in FIGS. 1, 5, 7, 9 and 11 to 13, a pair of projections 135, 135 are integrally provided on the brush holder 58 to protrude outwards further than the outer peripheries the housing 28a of the caliper body 27 and the flange 57b of the yoke 57 so that an operator can put his fingers on the projections 135 to remove the electric motor 25 from the caliper body 27. The projections 135 are integrally provided on the brush holder 58 to protrude outwards on a side opposite from the coupler portion 58a projectingly provided on the brush holder 58.

The metal cylindrical collars 74 for inserting the bolts 70 for fastening the motor case 56 to the housing 27a of the caliper body 27 are embedded at locations spaced apart from one another in the circumferential direction of the brush holder 58. The projections 135, 135 are projectingly provided on the brush holder 58 so as to sandwich one of the collars 74 (the collar 74 located on a side from the coupler portion 58a in this embodiment) from circumferentially opposite sides.

Recesses 136 are formed in the outer periphery of the brush holder 58 at a plurality of points (three points) in correspondence to sections where the collars 74 are embedded, and ribs 137 are integrally provided on the outer periphery of the brush holder 58 so that a plurality of the ribs are disposed in each of the recesses 136.

The coupler portion 58a is integrally formed on the coupler portion 58a in such a manner that a portion thereof protrudes toward the housing 27a of the caliper body 27. As clearly shown in FIG. 5, two sets of pairs of projections 138, 138; 139, 139 are provided in the housing 27a of the caliper body 27. The projections 138, 138; 139, 139 interfere with the coupler portion 58a when the operator tries to attach the motor case 56 to the caliper body 27 in a state in which the circumferential position of the motor case 56 relative to the caliper body 27 is displaced from a regular position.

Namely, because the motor case 56 is fastened to the caliper body 27 by the bolts 70 at three points circumferentially spaced apart from one another, the motor case 56 should be capable of being attached to the caliper body 27 by the bolts 70 at locations each turned at 180 degrees relative to the caliper body 27. Thus, it is required that the position of the coupler portion 58a is constant around the axis of the wheel, because the coupler portion 58a protrudes sideways from the brush holder 58. Also, it is required that the motor case 56 is attached to the caliper body 27 in a state in which the circumferential position thereof relative to the caliper body is a regular position, while the coupler portion 58a is in a correct position around the axis of the wheel.

Moreover, the projections 138, 138 in one of the sets are projectingly provided on the caliper body 27 so as to form a pair at locations symmetric with respect to the a diametrical line L of the cylinder bore 33 provided in the caliper body 27, and the projections 139, 139 in the other set are projectingly provided on the caliper body 27 so as to form a pair at locations symmetric with respect to the diametrical line of the cylinder bore 33, e.g., at locations symmetric with respect to the diametrical line L on a side opposite from the projections 138 in this embodiment.

In one of the left and right wheels, supposing that a state in which the coupler 58a is disposed at a location shown by a solid line in FIG. 5 is a state in which the circumferential portion of the motor case 56 relative to the caliper body 27 is a regular position, when the circumferential portion of the motor case 56 relative to the caliper body 27 is a position displaced from the regular position, the fastening of the motor case 56 to the caliper body 27 becomes impossible due to the interference with the coupler portion 58a by one of the projections 138 in the one set or one of the projections 139 in the other set.

In the other of the left and right wheels, when the circumferential portion of the motor case 56 relative to the caliper body 27 is the position displaced from the regular position, the fastening of the motor case 56 to the caliper body 27 becomes impossible due to the interference with the coupler portion 58a by the other of the projections 138 in the one set or the other of the projections 139 in the other set.

Figure 18:
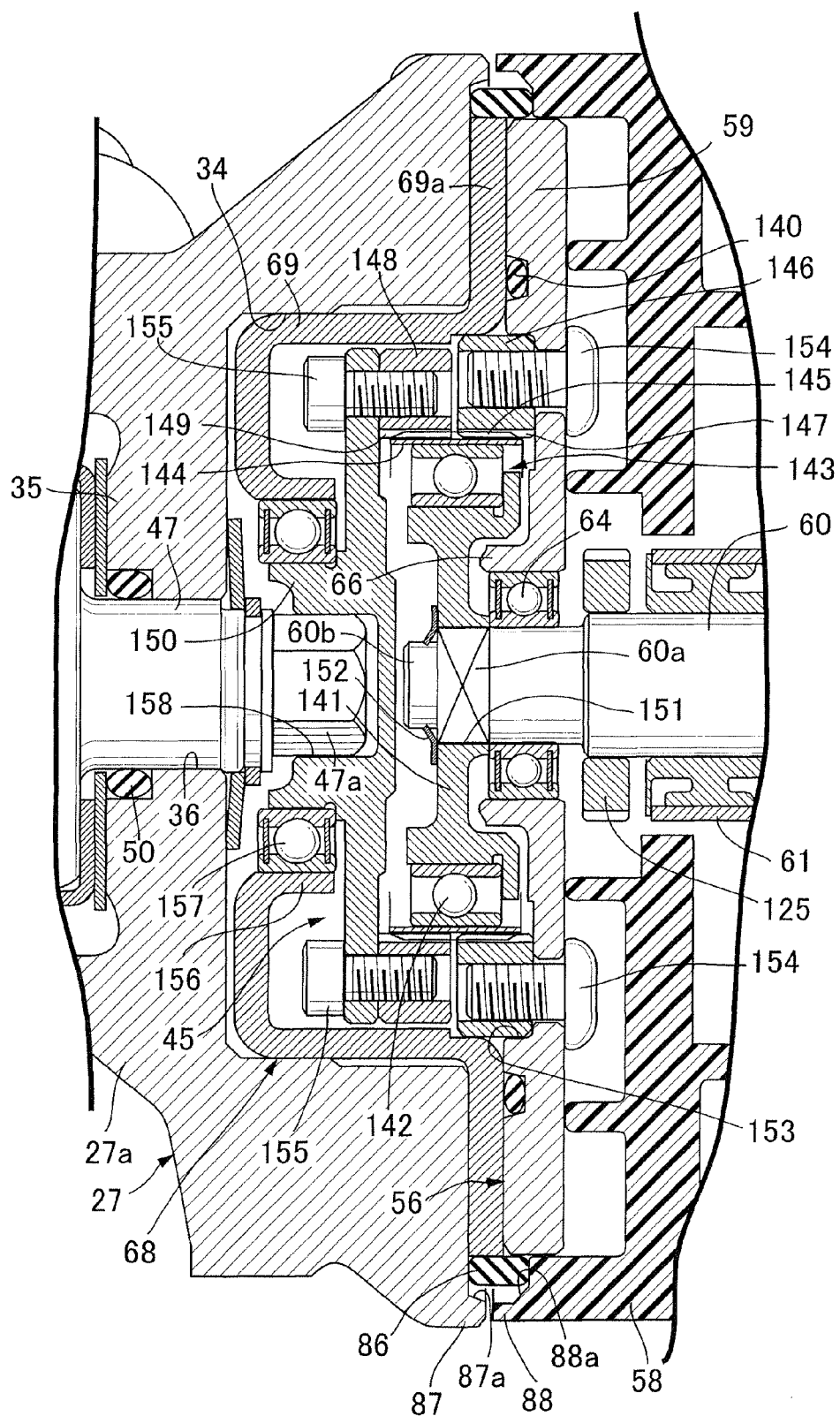
FIG. 18 is an enlarged sectional view showing a decelerating mechanism shown in FIG. 2.

Referring to FIG. 18, the decelerating mechanism 45 is housed in the case 68 which comprises the lid plate 59 constituting a portion of the motor case 56 and the cup-shaped case member 69 having the flange 69a abutting against the outer periphery of the lid plate 59 from the side opposite from the electric motor 25. The seal member 140 is interposed between the lid plate 59 and the case member 69.

The decelerating mechanism 45 is a wave-motion gear mechanism, is housed in the case 68, and comprises: a wave-motion generator 143 including an elliptic cam 141 relatively non-rotatably connected to the motor shaft 60 of the electric motor 25 and a third ball bearing 142 mounted to an outer periphery of the elliptic cam 141; a resilient ring gear 144 which has a large number of teeth provided on its outer periphery and which is mounted to an outer race of the third ball bearing 142; a stationary ring gear 146 which is fixed to the case 68 and which has, on its inner periphery, teeth 147 meshed with the teeth 145 on one of axial halves of the resilient ring gear 144; an output ring gear 148 having, on its inner periphery, teeth 149 meshed with the teeth 145 on the axial other half of the resilient gear 144; and an output rotary member 150 coupled to the output ring gear 148. Moreover, the number of the teeth 147 on the inner periphery of the stationary ring gear 146 is the same as the number of the teeth 145 on the outer periphery of the resilient ring gear 144, and the number of the teeth 149 on the inner periphery of the output ring gear 148 is increased by two more than the number of the teeth 145 on the outer periphery of the resilient ring gear 144.

The end of the motor shaft 60 on the side of the decelerating mechanism 45 protrudes into the case 68 in such a manner that it is supported on the second bearing housing 66 of the lid plate 59 in the case 68 with the second ball bearing 64 interposed therebetween. The elliptic cam 141 has one end abutting against an inner ring of the second ball bearing 64, and is provided with a connecting bore 151 into which a fitting shaft portion 60a provided at the end of the motor shaft 60 is fitted. The fitting shaft portion 60a and the connecting bore 151 are formed so that their cross sectional shapes are non-circular in order to disable the rotation of the elliptic cam 141 relative to the motor shaft 60.

A small-diameter shaft portion 60b is coaxially provided on the motor shaft 60 so as to protrude from the elliptic cam 141 toward the output rotary member 150. A pull nut 152 which is a stop member is mounted to the small-diameter shaft portion 60b so that it is brought into abutment and engagement with the elliptic cam 141 from a side opposite from the second ball bearing 64. Thus, the axial movement of the elliptic cam 141 relative to the motor shaft 60 is restricted by the second ball bearing 64 and the push nut 152.

The lid plate 59 is provided with a positioning portion for positioning at least one stationary member constituting a portion of the decelerating mechanism 45 (the stationary ring gear 146 in this embodiment) coaxially with the second ball bearing 64. In this embodiment, a fitting recess 153 is provided as the positioning portion coaxial with the cylindrical second ring housing 66 provided in the lid plate 59 in such a manner that the outer ring of the second ball bearing 64 is fitted into the cylindrical second ring housing 66. The fitting recess 153 is provided in the lid plate 59 in such a manner that the outer periphery of the stationary ring gear 146 is fitted into the fitting recess 153, and the stationary ring gear 146 in a state in which it is fitted in the fitting recess 153 is fixed to the lid plate 59 by a plurality of bolts 154.

The output ring gear 148 is fastened to the output rotary member 150 by a plurality of bolts 155. The output rotary member 150 is rotatably supported on a cylindrical third bearing housing 156 mounted at a central portion of the case member 69 in the case 68 with a fourth ball bearing interposed therebetween. A connecting recess 158 is provided in the output rotary member 150. A connecting fitting portion 47a is relatively non-rotatably fitted into the connecting recess 158. The connecting fitting portion 47a has a non-circular cross-sectional shape, and is provided at an end of the rotary shaft 47 in the motion converting mechanism 47 on the side of the decelerating mechanism 45. Thus, the output rotary member 150 is relatively non-rotatably connected to the rotary shaft 47, and a rotating power is decelerated by the decelerating mechanism 45 and transmitted to the rotary shaft 47.

The operation of this embodiment will be described below. The caliper body 27 includes the cylinder bore 33 in which the brake piston 38 is slidably received, and the partition wall 35 defining the fluid pressure chamber 37 between the partition wall 35 and the brake piston 38. The through-bore 36 is provided in the partition wall 35. The rotary shaft 47 constituting a portion of the motion converting mechanism 46 is rotatably passed through the through-bore 36. The thrust bearing 51 is interposed between the surface of the partition wall 35 facing the fluid pressure chamber 37 and the rotary shaft 47. The O-ring 50 is interposed between the inner periphery of the through-bore 36 and the outer periphery of the rotary shaft 47. Thus, a thrust force directed to side opposite from the electric motor 25 is applied to the rotary shaft 47 by the roll-back caused in the O-ring 50 upon the release of the fluid pressure after the application of the fluid pressure on the fluid pressure chamber 37. however, the Belleville spring 54 for exhibiting a resilient force equal to or larger than the thrust force is interposed between the partition wall 35 of the caliper body 27 and the rotary shaft 47 so as to bias the rotary shaft 47 toward the electric motor 25.

Therefore, even if the roll-back is caused in the O-ring 50 after the release of the fluid pressure in the fluid pressure chamber 37 to allow the thrust force directed toward the side opposite from the electric motor 25 to act on the rotary shaft 47, the rotary shaft 47 can not be moved axially. Therefore, a gap is prevented from being created in the sliding surface of the thrust bearing 51, thereby ensuring the smooth rotation of the rotary shaft 47.

At least a portion of the motor case 56 of the electric motor 25 is covered with the motor cover 80 having the flange 80b abutting against the motor case 56 from the side opposite from the case 68 in which the decelerating mechanism 45 is housed. The base ends of the plurality of connecting legs 81 passed through the motor case 56 and the case 68 are integrally provided on the motor cover 80, and the leading ends of the connecting legs 81 are fixed in an engaged manner to the flange 69a of the flange 69a of the case member 69 in the case 68.

Therefore, in a state in which the case 68 of the decelerating mechanism 45 is put into abutment against the motor case 56 to connect the decelerating mechanism 45 to the electric motor 25, the plurality of connecting legs 81 are passed through the motor case 56 and the case 68 while bringing the flange 80b of the motor cover 80 into abutment against the motor case 56, thereby engaging and fixing the tip ends of the connecting legs 81 with the case 68. Thus, the motor cover 80, the electric motor 25 and the decelerating mechanism 45 can be subassembled into a unit. In addition, the motor cover 80, the electric motor 25 and the decelerating mechanism 45 can be assembled to the caliper body 27 by fastening the electric motor 25 and the motor case 56 fastening the caliper body 27.

Therefore, as compared with a disk brake in which a motor cover, an electric motor and a decelerating mechanism are individually assembled to a caliper body, it is possible to reduce the number of assembled parts and the number of assembling steps to improve the assemblability. Also, because the connecting legs 81 respectively axially pierce the motor case 56 and the case 68 of the decelerating mechanism 45, it is easy to control the coaxial arrangement of the motor cover 80, the electric motor 25 and the decelerating mechanism 45.

In addition, the motor case 56 is attached to the caliper body 27 by the plurality of bolts 70 having the enlarged heads 70a brought into abutment and engagement with the motor case 56. The motor cover 80 which covers at least a portion of the motor case 56 and which is in close contact with the motor case 56 over the entire peripheries of the enlarged heads 70a is provided with the tubular portions 83 through which the bolts 70 can be inserted and which surround the enlarged heads 70a of the bolts 70. The caps 84 made of the elastic material are removably fitted into the leading ends of the tubular portions 83 so as to liquid-tightly close the leading ends of the tubular portions 83. Therefore, the enlarged heads 70a of the bolts 70 are liquid-tightly covered with the motor cover 80 and the caps 84. Thus, it is possible to prevent the enlarged heads 70a from being rusted, and even if a misalignment is generated between the insertion bores 71, 72 and 73 provided in the motor case 56 and the bolts 70, it is possible to reliably seal a portion between the bolts 70 and the motor case 56.

Because the caps 84 are integrally provided with the knobs 84a located outside the tubular portions 83 in a state in which the cap 84 is fitted into the tubular portions 83, the caps 84 can be easily separated from the tubular portions 83 by pinching and pulling the knobs 84a, thereby facilitating the maintenance operation.

Further, because the knobs 84a are formed into the shape such that they clamp the leading end of the tubular portion 83 from the outside, the knobs 84a can be easily grasped, and the appearance of the knobs 84a is improved in a state in which the caps 84 have been fitted into the tubular portions 83.

Furthermore, because the annular seal member 86 having a cross-sectional oblong shape longer in the direction along the axis of the electric motor 25 is interposed between the caliper body 27 and the motor case 56, it is possible to seal a portion between the caliper body 27 and the motor case 56 while absorbing the dimensional error of the distance between the opposed surfaces of the caliper body 27 and the motor case 56 and the assembling error thereof.

Moreover, the seal member 86 is interposed between the opposed surfaces of the caliper body 27 and the motor case 56, while being restricted from being flexed inwards, the annular restricting portions 87 and 88 having restricting faces 87a and 88a opposed to the seal member 86 from the outside are projectingly provided on the opposed surfaces of the caliper body 27 and the motor case 56 to extend toward each other, and the restricting faces 87a and 88a are formed as the tapered faces which are inclined so as to get away from the seal member 86 toward the leading end of the restricting portions 87 and 88. Therefore, when the seal member 86 is deformed into an outward convex shape, it is brought into abutment against the restricting faces 87a and 88a, thereby preventing a degradation in sealability.

The plurality of brushes 90 are retained on the brush holder 58 included in the electric motor 25 to come into sliding contact with the commutator 61 of the armature 62 mounted on the motor shaft 60, and the plus-side and minus-side internal feed terminals 96 and 97 interconnecting the plus-side and minus-side feed wires 92, 93; 94, 95 connected to the brushes 90 as well as the rotational angle detecting sensor 98 for detecting the rotational angle of the electric motor 25 are disposed on the brush holder 58, but the rotational angle detecting sensor 98 is disposed on the brush holder 58 on the side opposite from the plus-side and minus-side internal feed terminals 96 and 97 with respect to the armature 62. Therefore, the plus-side and minus-side feed wires 92, 93; 94, 95 connected to the brushes 90 can be easily connected to the plus-side and minus-side internal feed terminals 96 and 97 in such a manner that the rotational angle detecting sensor 98 does not act as an obstacle. In addition, the rotational angle detecting sensor 96 can be easily assembled in a larger space where the plus-side and minus-side internal feed terminals 96 and 97 are not provided, thereby facilitating the operation of connecting the plus-side and minus-side feed wires 92, 93; 94, 95 to the plus-side and minus-side internal feed terminals 96 and 97, and improving the assemblability of the rotational angle detecting sensor 98 to the brush holder 58.

In addition to the plus-side and minus-side external feed terminals 104 and 105 connected to the brushes 90 as well as the plus-side and minus-side external terminals 106 and 107 for the sensor connected to the rotational angle detecting sensor 98, the noise-countermeasure terminal 117 for electrically connecting the yoke 57 constituting a portion of the motor case 56 to the vehicle body B is mounted on the electric motor 25. Therefore, the yoke 57 of the motor case 56 exhibits a shield effect by virtue of a simple structure in which the yoke 57 is merely electrically connected to the vehicle body B and grounded, thereby inhibiting the generation of a radio-noise.

Moreover, the lead frame 103 forming the noise counter-measure terminal 117 at one end is embedded within the brush holder 58 made of the synthetic resin, and the coil spring 119 having an electrical conductivity is accommodated in the accommodating bore 118 provided in the brush holder 58 with a portion of the lead frame 103 facing the accommodating bore 118, so that one end of the coil spring 119 is in abutment against the lead frame 103 and the other end is in abutment against the yoke 57. When the yoke 57 and the brush holder 58 are assembled, it is unnecessary to conduct a special electrically connecting operation such as welding, thereby reliably ensuring the electrical connection of the yoke 57 and the noise countermeasure terminal 117.

In addition, the brush holder 58 is integrally provided with the coupler portion 58a on which the plus-side and minus-side external feed terminals 104 and 105, the plus-side and minus-side external terminals 106 and 107 for the sensor and the noise-countermeasure terminal 117 are disposed in common. Therefore, it is possible to simultaneously conduct the electrical connection of the plus-side and minus-side external power source wires 111 and 112 to the plus-side and minus-side external feed terminals 104 and 105, the electrical connection of the plus-side and minus-side external lead wires 112 and 113 for the sensor to the plus-side and minus-side external terminals 105 and 106 for the sensor, and the electrical connection of the noise countermeasure terminal 117 to the vehicle body B, leading to the facilitated electrically connecting operation.

The Hall IC 122 included in the rotational angle detecting sensor 98 is disposed within the electric motor 25 in such a manner that it is located outside the pulser 125 mounted on the motor shaft 60, and the Hall IC 122 is retained by the motor case 56 of the electric motor 25 and the sensor cover 127 made of the synthetic resin and detachably attached to the motor case 56. Thus, a water-proof sealing countermeasure exclusively for the Hall IC 122 is not required by virtue of the Hall IC 122 being disposed within the electric motor 25, and a part required to attach the Hall IC 122 to the motor case 56 is only the sensor cover 127, thereby reducing the number of parts.

Additionally, the Hall IC 122 is retained by the brush holder 58 constituting a portion of the motor case 56 and the sensor cover 127, and the connections of the plus-side and minus-side internal terminals 108 and 109 for the sensor to the Hall IC 122 are covered with the sensor cover 127. Therefore, it is possible to prevent friction powder produced by the sliding contact of the brushes 90 retained on the brush holder 58 with the commutator 61 from affecting the connections to generate an electric short-circuit.

Moreover, the magnet 124 disposed close to the Hall IC 122 is retained between the brush holder 58 and the sensor cover 127. Therefore, there is no need for a part exclusively used for disposing the magnet 124 on the brush holder 58, thereby reducing the number of parts. The yoke 57 constituting a portion of the motor case 56 is formed into the bottomed cylindrical shape having the flange 57b protruding radially outwards at its opened end, and the flange 57b of the yoke 57 and the outer periphery of the brush holder 58 sandwiched between the flange 57b and the caliper body 27 are fastened to the caliper body 27 at a plurality of circumferential fastening points, e.g., three points. The projections 135 are integrally provided on the brush holder 58 to protrude outwards further than the outer peripheries of the flange 57b of the yoke 57 and the housing 27a of the caliper body 27 so that the operator can put his fingers on the projections 135 when the operator tries to remove the electric motor 25 from the caliper body 27. Therefore, to remove the electric motor 25 from the caliper body 27, the fingers are put on the projections 135 integrally provided on the brush holder 58 to apply a force toward the side opposite from the caliper body. This enables the electric motor 25 to be removed from the caliper body 27 in such a manner the brush holder 58 is not separated from the yoke 57, because the brush holder 58 is sandwiched between the yoke 57 and the caliper body 27.

In addition, the projections 135 protrude outwards on the side opposite from the coupler portion 58a integrally provided on the brush holder 58 and hence, the removal of the electric motor 25 from the caliper body 27 can be facilitated in such a manner that the coupler portion 58a does not obstruct the putting of the fingers on the projections 135.

The metal cylindrical collars 74 for insertion of the bolts 70 are embedded in the brush holder 58 at the plurality of points for fastening by the bolts 70, and the pair of the projections 135 are integrally provided on the brush holder 58 so as to sandwich one of the collars 74 from the circumferentially opposite sides. Therefore, when the electric motor 25 is removed from the caliper body 27, a force applied to the brush holder 58 can be dispersed to two points. Moreover, the metal collar 74 is embedded in the brush holder 58 at a location sandwiched between the two projections 135 and hence, the brush holder 58 can be reinforced by the collar 74 in correspondence to the force applied to the projections 135.

Further, the recesses 136 are formed in the outer periphery of the brush holder 58 at the plurality of points including the point between the projections in correspondence to the sections in which the collars 74 are embedded, and the ribs 137 are integrally provided on the outer periphery of the brush holder 58 so that a plurality of the ribs are disposed in each of the recesses 136. Therefore, it is possible to avoid the generation of sink marks due to the presence of the collars 74 upon the die formation of the brush holder 58 in such a manner that the collars 74 are embedded. Moreover, there is a possibility that when the fingers are put on the projections 135, the fingers are liable to enter the recess 136 between both the projections 135, and a force in a removing direction is applied to only the yoke 57 by the fingers which have entered the recess 136. However, because the plurality of ribs 137 are disposed in each of the recesses 136, it is possible to prevent the fingers from entering the recess 136, and the electric motor 25 can be reliably removed along with the brush holder 58 from the caliper body 27.

Additionally, the projections 138 and 139 are provided on the housing 27a of the caliper body 27 and adapted to interfere with the coupler portion 58a protruding outwards from the brush holder 58, when the operator tries to attach the motor case 56 to the caliper body 27 in the state in which its circumferential position relative to the caliper body is displaced from the regular position. Therefore, because the projections 138 and 139 interfere with the coupler portion in the state in which the circumferential position of the motor case 56 relative to the caliper body is displaced from the regular position 58a protruding from the outer periphery of the motor case 56, it is possible to reliably prevent the occurrence of the erroneous assembling by ensuring that even if anyone carries out the assembling, the position of the coupler portion 58a relative to the caliper body 27 is surely the regular position. In other words, the motor case 56 is fastened to the caliper body 27 at the plurality of fastening points set at equal distances in the circumferential direction of the cylinder bore 33 and hence, when the motor case 56 is attached to the caliper body 27, the attitude of attachment of the motor case 56 to the caliper body 27 can be changed as much as the number of the fastening points. However, in the state in which the circumferential portion of the motor case 56 relative to the caliper body 27 is displaced from the regular position, it is possible to reliably prevent of the occurrence of the erroneous assembling by the interference of the projections 138 and 139 with the coupler portion 58a.

Moreover, a pair of the projections 138 and 139 are provided on the caliper body 27 at the locations to be symmetric with respect to the diametrical line L of the cylinder bore 33, and hence the caliper body 27 and the electric motor 25 can be used commonly for the left and right wheels. Therefore, it is unnecessary to prepare dies separately for the left and right wheels in die-molding of the caliper body 27, thereby reducing the cost.

The decelerating mechanism 45 is disposed coaxially with the electric motor 25 so as to decelerate the rotational power of the electric motor 25, and is a wave motion gear mechanism which includes: the wave motion generator 143 including the third ball bearing 142 mounted to the outer periphery of the elliptic cam 141 non-rotatably connected to the motor shaft 60 of the electric motor 25; the resilient ring gear 144 which has the plurality of teeth 145 provided on its outer periphery and which is mounted to the outer race of the third ball bearing 142; the stationary ring gear 146 having on its inner periphery the teeth 147 meshed with the teeth 145 on one of the axial halves of the resilient ring gear 144; the output ring gear 148 having on its inner periphery the teeth 149 meshed with the teeth 145 on the other axial half of the resilient ring gear; and the output rotary member 150 coupled to the output ring gear 148. The end of the motor shaft 60 on the side of the decelerating mechanism 45 is rotatably supported on the lid plate 59 of the case 58 which houses the decelerating mechanism 45 with the second ball bearing interposed therebetween. The elliptic cam 141 having one end abutting against the inner race of the second ball bearing 64 is provided with the connecting bore 151 through which the motor shaft 60 is non-rotatably passed. The push nut 152 is mounted over the motor shaft 60 to come into engagement with the elliptic cam 141 from the side opposite from the second ball bearing 64.

Therefore, the elliptic cam 141 is rotated along with the motor shaft 60 by virtue of the motor shaft 60 being non-rotatably coupled to the elliptic cam 141. Moreover, the axial movement of the elliptic cam 141 relative to the motor shaft 60 is restricted by the second ball bearing 64 interposed between the lid plate 59 of the case 68 housing the decelerating mechanism 45 and the motor shaft 60, and the push nut 152 mounted to the motor shaft 60. The push nut 152 is used in place of a ball bearing interposed between the output rotary member 150 and the elliptic cam 141 in order to restrict the axial movement of the elliptic cam 141, thereby reducing the cost. The axial length required in the push nut 152 is reduced, thereby reducing the axial length of the decelerating mechanism 45, leading to a reduction in the size.

The motor case 56 includes: the yoke 57 formed into the bottomed cylindrical shape having the end wall 57a at one end on which the motor shaft 60 is rotatably supported at one end with the first ball bearing 63 interposed therebetween; and the lid plate 59 which is attached to the other end of the yoke 57 and on which the motor shaft 60 is rotatably supported at the other end with the second ball bearing 64 interposed therebetween. The lid plate 59 is provided with the fitting recess 53 into which the stationary ring gear 146 which is at least one stationary member constituting a portion of the decelerating mechanism 45 is fitted, whereby the stationary ring gear 146 is positioned coaxially with the second ball bearing 64. The stationary ring gear 146 positioned in the fitting recess 153 is fixed to the lid plate 59. Therefore, it is possible to assemble the decelerating mechanism 45 to the electric motor 25 while enhancing the coaxiality, and to facilitate the control of the coaxiality while enhancing the coaxiality thereby preventing the generation of an operational sound. In addition, the lid plate 59 can be used commonly as a portion of the case 68 of the decelerating mechanism 45, thereby reducing the axial length upon the interconnection of the deceleration mechanism 45 and the electric motor 25 to reduce the size.

Although the embodiment of the present invention has been described, the present invention is not limited to the above-described embodiment, and various modifications in design may be made without departing from the subject matter of the invention defined in the claims.

What is claimed is:

1. A disk brake for a vehicle, comprising:
an electric motor which is attached to a caliper body so as to exhibit a power for urging a friction pad toward a disk rotor, the electric motor including a motor shaft provided with an armature having a commutator, and a brush holder for holding brushes which contact the commutator at positions at even distances in a circumferential direction of the armature;
internal feed terminals disposed in the brush holder so as to provide connection between the brushes and feed wires respectively leading to the brushes; and
a rotational angle detecting sensor disposed in the brush holder so as to detect a rotational angle of the electric motor,
wherein the rotational angle detecting sensor is disposed in the brush holder on a side opposite from the internal feed terminals with respect to the motor shaft, wherein the motor shaft is disposed directly between the rotational angle detecting sensor and the internal feed terminals.

\* \* \* \* \*